United States Patent
Lutian et al.

(10) Patent No.: US 9,354,748 B2
(45) Date of Patent: May 31, 2016

(54) OPTICAL STYLUS INTERACTION

(75) Inventors: John M. Lutian, Bellevue, WA (US);
Liang Wang, Sammamish, WA (US);
Karlton D. Powell, Lake Stevens, WA (US); Steven Nabil Bathiche, Kirkland, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 0 days.

(21) Appl. No.: 13/371,725

(22) Filed: Feb. 13, 2012

(65) Prior Publication Data
US 2013/0207937 A1    Aug. 15, 2013

(51) Int. Cl.
G06F 3/033    (2013.01)
G06F 3/042    (2006.01)
G06F 3/0354    (2013.01)

(52) U.S. Cl.
CPC ............ *G06F 3/042* (2013.01); *G06F 3/03545* (2013.01); *G06F 2203/04808* (2013.01)

(58) Field of Classification Search
USPC .................................................. 345/179–184
See application file for complete search history.

(56) References Cited

U.S. PATENT DOCUMENTS

| | | |
|---|---|---|
| 578,325 A | 3/1897 | Fleming |
| 4,046,975 A | 9/1977 | Seeger, Jr. |
| 4,065,649 A | 12/1977 | Carter et al. |
| 4,086,451 A | 4/1978 | Boulanger |
| 4,237,347 A | 12/1980 | Burundukov et al. |
| 4,239,338 A | 12/1980 | Borrelli et al. |
| 4,243,861 A | 1/1981 | Strandwitz |
| 4,279,021 A | 7/1981 | See et al. |
| 4,302,648 A | 11/1981 | Sado et al. |

(Continued)

FOREIGN PATENT DOCUMENTS

| | | |
|---|---|---|
| CA | 990023 | 6/1976 |
| CN | 1440513 | 9/2003 |

(Continued)

OTHER PUBLICATIONS

"Accessing Device Sensors", retrieved from <https://developer.palm.com/content/api/dev-guide/pdk/accessing-device-sensors.html> on May 25, 2012, 4 pages.

(Continued)

*Primary Examiner* — Seokyun Moon
*Assistant Examiner* — Josemarie G Acha, III
(74) *Attorney, Agent, or Firm* — Brandon Roper; Judy Yee; Micky Minhas

(57) ABSTRACT

Optical stylus interaction techniques are described. In an implementation, a display of a computing device includes optical sensors capable of detecting images projected by a stylus. A stylus may include a projection system to project various images used to convey interaction information that may be interpreted by the computing device. Based on recognition of different projected images, a context for interaction of the stylus may be ascertained and corresponding operations may be performed by the computing device. This may include resolving a spatial position of the stylus relative to the display device as well as movement of the stylus and images that defines various stylus-based gestures. In addition, the environment for optical stylus interaction enables a writing mode that emulates natural writing by mapping different projectable images to changes in pressure applied to the stylus when in contact with the display.

20 Claims, 8 Drawing Sheets

(56) References Cited

U.S. PATENT DOCUMENTS

| | | |
|---|---|---|
| 4,317,013 A | 2/1982 | Larson |
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,576,436 A | 3/1986 | Daniel |
| 4,577,822 A | 3/1986 | Wilkerson |
| 4,588,187 A | 5/1986 | Dell |
| 4,607,147 A | 8/1986 | Ono et al. |
| 4,615,579 A | 10/1986 | Whitehead |
| 4,643,604 A | 2/1987 | Enrico |
| 4,651,133 A | 3/1987 | Ganesan et al. |
| 4,735,394 A | 4/1988 | Facco |
| 4,735,495 A | 4/1988 | Henkes |
| 5,008,497 A | 4/1991 | Asher |
| 5,067,573 A | 11/1991 | Uchida |
| 5,111,223 A | 5/1992 | Omura |
| 5,128,829 A | 7/1992 | Loew |
| 5,220,521 A | 6/1993 | Kikinis |
| 5,249,978 A | 10/1993 | Gazda et al. |
| 5,283,559 A | 2/1994 | Kalendra et al. |
| 5,319,455 A | 6/1994 | Hoarty et al. |
| 5,331,443 A | 7/1994 | Stanisci |
| 5,339,382 A | 8/1994 | Whitehead |
| 5,340,528 A | 8/1994 | Machida et al. |
| 5,349,403 A | 9/1994 | Lo |
| 5,363,075 A | 11/1994 | Fanucchi |
| 5,375,076 A | 12/1994 | Goodrich et al. |
| 5,406,415 A | 4/1995 | Kelly |
| 5,480,118 A | 1/1996 | Cross |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,618,232 A | 4/1997 | John |
| 5,621,494 A | 4/1997 | Kazumi et al. |
| 5,681,220 A | 10/1997 | Bertram et al. |
| 5,737,183 A | 4/1998 | Kobayashi et al. |
| 5,745,376 A | 4/1998 | Barker et al. |
| 5,748,114 A | 5/1998 | Koehn |
| 5,750,939 A | 5/1998 | Makinwa et al. |
| 5,781,406 A | 7/1998 | Hunte |
| 5,806,955 A | 9/1998 | Parkyn, Jr. et al. |
| 5,807,175 A | 9/1998 | Davis et al. |
| 5,808,713 A | 9/1998 | Broer et al. |
| 5,818,361 A | 10/1998 | Acevedo |
| 5,825,982 A | 10/1998 | Wright et al. |
| 5,828,770 A | 10/1998 | Leis et al. |
| 5,838,403 A | 11/1998 | Jannson et al. |
| 5,842,027 A | 11/1998 | Oprescu et al. |
| 5,850,135 A | 12/1998 | Kuki et al. |
| 5,861,990 A | 1/1999 | Tedesco |
| 5,874,697 A | 2/1999 | Selker et al. |
| 5,886,675 A | 3/1999 | Aye et al. |
| 5,905,485 A | 5/1999 | Podoloff |
| 5,921,652 A | 7/1999 | Parker et al. |
| 5,924,555 A | 7/1999 | Sadamori et al. |
| 5,926,170 A | 7/1999 | Oba |
| 5,929,946 A | 7/1999 | Sharp et al. |
| 5,957,191 A | 9/1999 | Okada et al. |
| 5,967,637 A | 10/1999 | Ishikawa et al. |
| 5,971,635 A | 10/1999 | Wise |
| 5,973,677 A | 10/1999 | Gibbons |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima et al. |
| 6,061,644 A | 5/2000 | Leis |
| 6,072,551 A | 6/2000 | Jannson et al. |
| 6,108,200 A | 8/2000 | Fullerton |
| 6,112,797 A | 9/2000 | Colson et al. |
| 6,124,906 A | 9/2000 | Kawada et al. |
| 6,128,007 A | 10/2000 | Seybold |
| 6,129,444 A | 10/2000 | Tognoni |
| 6,147,859 A | 11/2000 | Abboud |
| 6,172,807 B1 | 1/2001 | Akamatsu |
| 6,178,443 B1 | 1/2001 | Lin |
| 6,188,391 B1 | 2/2001 | Seely et al. |
| 6,215,590 B1 | 4/2001 | Okano |
| 6,228,926 B1 | 5/2001 | Golumbic |
| 6,232,934 B1 | 5/2001 | Heacock et al. |
| 6,234,820 B1 | 5/2001 | Perino et al. |
| 6,254,105 B1 | 7/2001 | Rinde et al. |
| 6,256,447 B1 | 7/2001 | Laine |
| 6,278,490 B1 | 8/2001 | Fukuda et al. |
| 6,279,060 B1 | 8/2001 | Luke et al. |
| 6,300,986 B1 | 10/2001 | Travis |
| 6,329,617 B1 | 12/2001 | Burgess |
| 6,344,791 B1 | 2/2002 | Armstrong |
| 6,351,273 B1 | 2/2002 | Lemelson et al. |
| 6,353,503 B1 | 3/2002 | Spitzer et al. |
| 6,366,440 B1 | 4/2002 | Kung |
| 6,380,497 B1 | 4/2002 | Hashimoto et al. |
| 6,411,266 B1 | 6/2002 | Maguire, Jr. |
| 6,437,682 B1 | 8/2002 | Vance |
| 6,441,362 B1 * | 8/2002 | Ogawa ............... G06F 3/03545 178/19.04 |
| 6,469,755 B1 | 10/2002 | Adachi et al. |
| 6,506,983 B1 | 1/2003 | Babb et al. |
| 6,511,378 B1 | 1/2003 | Bhatt et al. |
| 6,529,179 B1 | 3/2003 | Hashimoto et al. |
| 6,532,147 B1 | 3/2003 | Christ, Jr. |
| 6,543,949 B1 | 4/2003 | Ritchey et al. |
| 6,545,577 B2 | 4/2003 | Yap |
| 6,565,439 B2 | 5/2003 | Shinohara et al. |
| 6,574,030 B1 | 6/2003 | Mosier |
| 6,597,347 B1 | 7/2003 | Yasutake |
| 6,600,121 B1 | 7/2003 | Olodort et al. |
| 6,603,408 B1 | 8/2003 | Gaba |
| 6,608,664 B1 | 8/2003 | Hasegawa |
| 6,617,536 B2 | 9/2003 | Kawaguchi |
| 6,648,485 B1 | 11/2003 | Colgan et al. |
| 6,651,943 B2 | 11/2003 | Cho et al. |
| 6,681,333 B1 | 1/2004 | Cho |
| 6,685,369 B2 | 2/2004 | Lien |
| 6,695,273 B2 | 2/2004 | Iguchi |
| 6,700,617 B1 | 3/2004 | Hamamura et al. |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,790,054 B1 | 9/2004 | Boonsue |
| 6,795,146 B2 | 9/2004 | Dozov et al. |
| 6,813,143 B2 | 11/2004 | Makela |
| 6,819,082 B2 | 11/2004 | Yang |
| 6,819,316 B2 | 11/2004 | Schulz et al. |
| 6,847,488 B2 | 1/2005 | Travis |
| 6,856,506 B2 | 2/2005 | Doherty et al. |
| 6,859,565 B2 | 2/2005 | Baron |
| 6,861,961 B2 | 3/2005 | Sandbach et al. |
| 6,864,573 B2 | 3/2005 | Robertson et al. |
| 6,867,828 B2 | 3/2005 | Taira et al. |
| 6,870,671 B2 | 3/2005 | Travis |
| 6,895,164 B2 | 5/2005 | Saccomanno |
| 6,898,315 B2 | 5/2005 | Guha |
| 6,902,214 B2 | 6/2005 | Smith |
| 6,914,197 B2 | 7/2005 | Doherty et al. |
| 6,922,333 B2 | 7/2005 | Weng et al. |
| 6,929,291 B2 | 8/2005 | Chen |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,980,177 B2 | 12/2005 | Struyk |
| 6,981,792 B2 | 1/2006 | Nagakubo et al. |
| 7,002,624 B1 | 2/2006 | Uchino et al. |

(56) References Cited

U.S. PATENT DOCUMENTS

| | | |
|---|---|---|
| 7,006,080 B2 | 2/2006 | Gettemy |
| 7,007,238 B2 | 2/2006 | Glaser |
| 7,018,678 B2 | 3/2006 | Gronbeck et al. |
| 7,019,491 B2 | 3/2006 | Bozzone et al. |
| 7,023,430 B2 | 4/2006 | Liu et al. |
| 7,025,908 B1 | 4/2006 | Hayashi et al. |
| 7,051,149 B2 | 5/2006 | Wang et al. |
| 7,068,496 B2 | 6/2006 | Wong et al. |
| 7,073,933 B2 | 7/2006 | Gotoh et al. |
| 7,083,295 B1 | 8/2006 | Hanna |
| 7,091,436 B2 | 8/2006 | Serban |
| 7,095,404 B2 | 8/2006 | Vincent et al. |
| 7,099,149 B2 | 8/2006 | Krieger et al. |
| 7,101,048 B2 | 9/2006 | Travis |
| 7,102,683 B2 | 9/2006 | Perry et al. |
| 7,104,679 B2 | 9/2006 | Shin et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,129,979 B1 | 10/2006 | Lee |
| 7,136,282 B1 | 11/2006 | Rebeske |
| 7,151,635 B2 | 12/2006 | Bidnyk et al. |
| 7,152,985 B2 | 12/2006 | Benitez et al. |
| 7,153,017 B2 | 12/2006 | Yamashita et al. |
| D535,292 S | 1/2007 | Shi et al. |
| 7,162,153 B2 | 1/2007 | Harter, Jr. et al. |
| 7,169,460 B1 | 1/2007 | Chen et al. |
| 7,194,662 B2 | 3/2007 | Do et al. |
| 7,199,554 B2 | 4/2007 | Kim et al. |
| 7,199,931 B2 | 4/2007 | Boettiger et al. |
| 7,201,508 B2 | 4/2007 | Misaras |
| 7,202,837 B2 | 4/2007 | Ihara |
| 7,213,323 B2 | 5/2007 | Baker et al. |
| 7,213,991 B2 | 5/2007 | Chapman et al. |
| 7,224,830 B2 | 5/2007 | Nefian et al. |
| 7,239,505 B2 | 7/2007 | Keely et al. |
| 7,260,221 B1 | 8/2007 | Atsmon |
| 7,260,823 B2 | 8/2007 | Schlack et al. |
| 7,277,087 B2 | 10/2007 | Hill et al. |
| 7,287,738 B2 | 10/2007 | Pitlor |
| 7,295,720 B2 | 11/2007 | Raskar |
| 7,301,759 B2 | 11/2007 | Hsiung |
| 7,311,526 B2 | 12/2007 | Rohrbach et al. |
| 7,331,793 B2 | 2/2008 | Hernandez et al. |
| 7,364,343 B2 | 4/2008 | Keuper et al. |
| 7,370,342 B2 | 5/2008 | Ismail et al. |
| 7,374,312 B2 | 5/2008 | Feng et al. |
| 7,375,885 B2 | 5/2008 | Ijzerman et al. |
| 7,379,094 B2 | 5/2008 | Yoshida et al. |
| 7,384,178 B2 | 6/2008 | Sumida et al. |
| 7,400,377 B2 | 7/2008 | Evans et al. |
| 7,400,817 B2 | 7/2008 | Lee et al. |
| 7,410,286 B2 | 8/2008 | Travis |
| 7,423,557 B2 | 9/2008 | Kang |
| 7,431,489 B2 | 10/2008 | Yeo et al. |
| 7,443,443 B2 | 10/2008 | Raskar et al. |
| 7,447,934 B2 | 11/2008 | Dasari et al. |
| 7,457,108 B2 | 11/2008 | Ghosh |
| 7,467,948 B2 | 12/2008 | Lindberg et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,499,216 B2 | 3/2009 | Niv et al. |
| 7,502,803 B2 | 3/2009 | Culter et al. |
| 7,503,684 B2 | 3/2009 | Ueno et al. |
| 7,509,042 B2 | 3/2009 | Mori et al. |
| 7,515,143 B2 | 4/2009 | Keam et al. |
| 7,528,374 B2 | 5/2009 | Smitt et al. |
| 7,542,052 B2 | 6/2009 | Solomon et al. |
| 7,545,429 B2 | 6/2009 | Travis |
| 7,558,594 B2 | 7/2009 | Wilson |
| 7,559,834 B1 | 7/2009 | York |
| 7,561,131 B2 | 7/2009 | Ijzerman et al. |
| 7,572,045 B2 | 8/2009 | Hoelen et al. |
| RE40,891 E | 9/2009 | Yasutake |
| 7,620,244 B1 | 11/2009 | Collier |
| 7,622,907 B2 | 11/2009 | Vranish |
| 7,626,582 B1 | 12/2009 | Nicolas et al. |
| 7,631,327 B2 | 12/2009 | Dempski et al. |
| 7,636,921 B2 | 12/2009 | Louie |
| 7,639,876 B2 | 12/2009 | Clary et al. |
| 7,643,213 B2 | 1/2010 | Boettiger et al. |
| 7,656,392 B2 | 2/2010 | Bolender |
| 7,660,047 B1 | 2/2010 | Travis et al. |
| 7,675,598 B2 | 3/2010 | Hong |
| 7,686,694 B2 | 3/2010 | Cole |
| 7,705,558 B2 | 4/2010 | Silverman |
| 7,715,187 B2 | 5/2010 | Hotelling et al. |
| 7,722,792 B2 | 5/2010 | Uezaki et al. |
| 7,724,952 B2 | 5/2010 | Shum et al. |
| 7,728,923 B2 | 6/2010 | Kim et al. |
| 7,729,493 B2 | 6/2010 | Krieger et al. |
| 7,731,147 B2 | 6/2010 | Rha |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,775,567 B2 | 8/2010 | Ligtenberg et al. |
| 7,777,972 B1 | 8/2010 | Chen et al. |
| 7,782,341 B2 | 8/2010 | Kothandaraman |
| 7,782,342 B2 | 8/2010 | Koh |
| 7,788,474 B2 | 8/2010 | Switzer et al. |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,822,338 B2 | 10/2010 | Wernersson |
| 7,844,985 B2 | 11/2010 | Hendricks et al. |
| 7,852,621 B2 | 12/2010 | Lin et al. |
| 7,855,716 B2 | 12/2010 | McCreary et al. |
| 7,865,639 B2 | 1/2011 | McCoy et al. |
| 7,884,807 B2 | 2/2011 | Hovden et al. |
| 7,893,921 B2 | 2/2011 | Sato |
| 7,898,797 B2 | 3/2011 | Fan et al. |
| 7,907,394 B2 | 3/2011 | Richardson et al. |
| D636,397 S | 4/2011 | Green |
| 7,918,559 B2 | 4/2011 | Tesar |
| 7,927,654 B2 | 4/2011 | Hagood et al. |
| 7,928,964 B2 | 4/2011 | Kolmykov-Zotov et al. |
| 7,936,501 B2 | 5/2011 | Smith et al. |
| 7,944,520 B2 | 5/2011 | Ichioka et al. |
| 7,945,717 B2 | 5/2011 | Rivalsi |
| 7,957,082 B2 | 6/2011 | Mi et al. |
| 7,965,268 B2 | 6/2011 | Gass et al. |
| 7,967,462 B2 | 6/2011 | Ogiro et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 7,991,257 B1 | 8/2011 | Coleman |
| 8,007,158 B2 | 8/2011 | Woo et al. |
| 8,016,255 B2 | 9/2011 | Lin |
| 8,018,386 B2 | 9/2011 | Qi et al. |
| 8,018,579 B1 | 9/2011 | Krah |
| 8,026,904 B2 | 9/2011 | Westerman |
| 8,035,614 B2 | 10/2011 | Bell et al. |
| 8,035,624 B2 | 10/2011 | Bell et al. |
| 8,053,688 B2 | 11/2011 | Conzola et al. |
| 8,059,391 B2 | 11/2011 | Chang et al. |
| 8,065,624 B2 | 11/2011 | Morin et al. |
| 8,069,356 B2 | 11/2011 | Rathi et al. |
| RE42,992 E | 12/2011 | David |
| 8,077,160 B2 | 12/2011 | Land et al. |
| 8,090,885 B2 | 1/2012 | Callaghan et al. |
| 8,098,233 B2 | 1/2012 | Hotelling et al. |
| 8,102,362 B2 | 1/2012 | Ricks et al. |
| 8,115,499 B2 | 2/2012 | Osoinach et al. |
| 8,115,718 B2 | 2/2012 | Chen et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,120,166 B2 | 2/2012 | Koizumi et al. |
| 8,130,203 B2 | 3/2012 | Westerman |
| 8,149,219 B2 | 4/2012 | Lii et al. |
| 8,149,272 B2 | 4/2012 | Evans et al. |

(56) References Cited

U.S. PATENT DOCUMENTS

| | | | |
|---|---|---|---|
| 8,154,524 B2 | 4/2012 | Wilson et al. |
| 8,162,282 B2 | 4/2012 | Hu et al. |
| D659,139 S | 5/2012 | Gengler |
| 8,169,185 B2 | 5/2012 | Partovi et al. |
| 8,169,421 B2 | 5/2012 | Wright et al. |
| 8,179,236 B2 | 5/2012 | Weller et al. |
| 8,184,190 B2 | 5/2012 | Dosluoglu |
| 8,189,973 B2 | 5/2012 | Travis et al. |
| 8,216,074 B2 | 7/2012 | Sakuma |
| 8,223,489 B2 | 7/2012 | Shih |
| 8,229,509 B2 | 7/2012 | Paek et al. |
| 8,229,522 B2 | 7/2012 | Kim et al. |
| 8,231,099 B2 | 7/2012 | Chen |
| 8,248,791 B2 | 8/2012 | Wang et al. |
| 8,251,563 B2 | 8/2012 | Papakonstantinou et al. |
| 8,255,708 B1 | 8/2012 | Zhang |
| 8,259,091 B2 | 9/2012 | Yeh |
| 8,264,310 B2 | 9/2012 | Lauder et al. |
| 8,267,368 B2 | 9/2012 | Torii et al. |
| 8,269,731 B2 | 9/2012 | Molne |
| 8,274,784 B2 | 9/2012 | Franz et al. |
| 8,279,589 B2 | 10/2012 | Kim |
| 8,310,508 B2 | 11/2012 | Hekstra et al. |
| 8,310,768 B2 | 11/2012 | Lin et al. |
| 8,322,290 B1 | 12/2012 | Mignano |
| 8,325,416 B2 | 12/2012 | Lesage et al. |
| 8,342,857 B2 | 1/2013 | Palli et al. |
| 8,345,920 B2 | 1/2013 | Ferren et al. |
| 8,354,806 B2 | 1/2013 | Travis et al. |
| 8,362,975 B2 | 1/2013 | Uehara |
| 8,373,664 B2 | 2/2013 | Wright |
| 8,387,078 B2 | 2/2013 | Memmott |
| 8,389,078 B2 | 3/2013 | Lin et al. |
| 8,416,206 B2 | 4/2013 | Carpendale et al. |
| 8,416,559 B2 | 4/2013 | Agata et al. |
| 8,466,902 B2 | 6/2013 | Boer et al. |
| 8,466,954 B2 | 6/2013 | Ko et al. |
| 8,467,133 B2 | 6/2013 | Miller |
| 8,497,657 B2 | 7/2013 | Franks et al. |
| 8,498,100 B1 | 7/2013 | Whitt, III et al. |
| 8,513,547 B2 * | 8/2013 | Ooi ................. G06F 3/0317 178/18.09 |
| 8,515,501 B2 | 8/2013 | Lee et al. |
| 8,543,227 B1 | 9/2013 | Perek et al. |
| 8,548,608 B2 | 10/2013 | Perek et al. |
| 8,560,004 B1 | 10/2013 | Tsvetkov et al. |
| 8,564,944 B2 | 10/2013 | Whitt, III et al. |
| 8,565,560 B2 | 10/2013 | Popovich et al. |
| 8,570,725 B2 | 10/2013 | Whitt, III et al. |
| 8,571,539 B1 | 10/2013 | Ranganathan et al. |
| 8,582,206 B2 | 11/2013 | Travis |
| 8,599,542 B1 | 12/2013 | Healey et al. |
| 8,600,120 B2 | 12/2013 | Gonion et al. |
| 8,600,526 B2 | 12/2013 | Nielsen et al. |
| 8,610,015 B2 | 12/2013 | Whitt et al. |
| 8,614,666 B2 | 12/2013 | Whitman et al. |
| 8,646,999 B2 | 2/2014 | Shaw et al. |
| 8,654,030 B1 | 2/2014 | Mercer |
| 8,692,212 B1 * | 4/2014 | Craft ................. G06F 3/0317 250/458.1 |
| 8,699,215 B2 | 4/2014 | Whitt, III et al. |
| 8,700,931 B2 | 4/2014 | Gudlavenkatasiva et al. |
| 8,705,229 B2 | 4/2014 | Ashcraft et al. |
| 8,719,603 B2 | 5/2014 | Belesiu |
| 8,723,842 B2 | 5/2014 | Kaneda et al. |
| 8,724,302 B2 | 5/2014 | Whitt et al. |
| 8,738,090 B2 | 5/2014 | Kanda |
| 8,749,529 B2 | 6/2014 | Powell et al. |
| 8,780,540 B2 | 7/2014 | Whitt, III et al. |
| 8,780,541 B2 | 7/2014 | Whitt et al. |
| 8,854,799 B2 | 10/2014 | Whitt, III et al. |
| 8,873,227 B2 | 10/2014 | Whitt et al. |
| 8,903,517 B2 | 12/2014 | Perek et al. |
| 8,947,353 B2 | 2/2015 | Boulanger et al. |
| 8,964,379 B2 | 2/2015 | Rihn et al. |
| 9,001,028 B2 * | 4/2015 | Baker ................. H04N 9/3129 345/156 |
| 9,075,566 B2 | 7/2015 | Whitt, III et al. |
| 9,158,384 B2 | 10/2015 | Whitt, III et al. |
| 9,176,901 B2 | 11/2015 | Whitt, III et al. |
| 9,201,185 B2 | 12/2015 | Large |
| 9,256,089 B2 | 2/2016 | Emerton et al. |
| 9,268,373 B2 | 2/2016 | Whitt et al. |
| 9,304,949 B2 | 4/2016 | Whitman et al. |
| 2001/0020455 A1 | 9/2001 | Schifferl |
| 2001/0023818 A1 | 9/2001 | Masaru et al. |
| 2001/0035859 A1 | 11/2001 | Kiser |
| 2002/0000977 A1 | 1/2002 | Vranish |
| 2002/0008854 A1 | 1/2002 | Travis et al. |
| 2002/0044216 A1 | 4/2002 | Cha |
| 2002/0103616 A1 | 8/2002 | Park et al. |
| 2002/0113882 A1 | 8/2002 | Pollard et al. |
| 2002/0126445 A1 | 9/2002 | Minaguchi et al. |
| 2002/0134828 A1 | 9/2002 | Sandbach et al. |
| 2002/0138772 A1 | 9/2002 | Crawford et al. |
| 2002/0154059 A1 | 10/2002 | Oh |
| 2002/0163510 A1 * | 11/2002 | Williams et al. .............. 345/179 |
| 2002/0190823 A1 | 12/2002 | Yap |
| 2003/0016282 A1 | 1/2003 | Koizumi |
| 2003/0028688 A1 * | 2/2003 | Tiphane ................. G02B 27/20 710/1 |
| 2003/0036365 A1 | 2/2003 | Kuroda |
| 2003/0044215 A1 | 3/2003 | Monney et al. |
| 2003/0108720 A1 | 6/2003 | Kashino |
| 2003/0128285 A1 | 7/2003 | Itoh |
| 2003/0132916 A1 | 7/2003 | Kramer |
| 2003/0137821 A1 | 7/2003 | Gotoh et al. |
| 2003/0148740 A1 | 8/2003 | Yau et al. |
| 2003/0163611 A1 | 8/2003 | Nagao |
| 2003/0165017 A1 | 9/2003 | Amitai |
| 2003/0195937 A1 | 10/2003 | Kircher, Jr. |
| 2003/0197687 A1 | 10/2003 | Shetter |
| 2003/0197806 A1 | 10/2003 | Perry et al. |
| 2003/0198008 A1 | 10/2003 | Leapman et al. |
| 2004/0005184 A1 | 1/2004 | Kim et al. |
| 2004/0048941 A1 | 3/2004 | Raffel et al. |
| 2004/0056843 A1 | 3/2004 | Lin et al. |
| 2004/0095333 A1 | 5/2004 | Morag et al. |
| 2004/0100457 A1 | 5/2004 | Mandle |
| 2004/0115994 A1 | 6/2004 | Wulff et al. |
| 2004/0156168 A1 | 8/2004 | LeVasseur et al. |
| 2004/0169641 A1 | 9/2004 | Bean et al. |
| 2004/0174709 A1 | 9/2004 | Buelow, II et al. |
| 2004/0189822 A1 | 9/2004 | Shimada |
| 2004/0212553 A1 * | 10/2004 | Wang ................... B43K 29/00 345/32 |
| 2004/0212598 A1 | 10/2004 | Kraus et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0002073 A1 | 1/2005 | Nakamura et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0057521 A1 | 3/2005 | Aull et al. |
| 2005/0059489 A1 | 3/2005 | Kim |
| 2005/0062715 A1 | 3/2005 | Tsuji et al. |
| 2005/0068460 A1 | 3/2005 | Lin |
| 2005/0094895 A1 | 5/2005 | Baron |
| 2005/0099400 A1 | 5/2005 | Lee |
| 2005/0100690 A1 | 5/2005 | Mayer et al. |
| 2005/0134717 A1 | 6/2005 | Misawa |
| 2005/0146512 A1 | 7/2005 | Hill et al. |
| 2005/0231156 A1 | 10/2005 | Yan |
| 2005/0236848 A1 | 10/2005 | Kim et al. |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2005/0265035 A1 | 12/2005 | Brass et al. |
| 2005/0285703 A1 | 12/2005 | Wheeler et al. |
| 2006/0010400 A1 | 1/2006 | Dehlin et al. |
| 2006/0012767 A1 | 1/2006 | Komatsuda et al. |
| 2006/0028400 A1 | 2/2006 | Lapstun et al. |

(56) References Cited

U.S. PATENT DOCUMENTS

| | | |
|---|---|---|
| 2006/0028476 A1 | 2/2006 | Sobel |
| 2006/0028838 A1 | 2/2006 | Imade |
| 2006/0030295 A1 | 2/2006 | Adams et al. |
| 2006/0049993 A1 | 3/2006 | Lin et al. |
| 2006/0070384 A1 | 4/2006 | Ertel |
| 2006/0082973 A1 | 4/2006 | Egbert et al. |
| 2006/0083004 A1 | 4/2006 | Cok |
| 2006/0085658 A1 | 4/2006 | Allen et al. |
| 2006/0092379 A1 | 5/2006 | Cho et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0146573 A1 | 7/2006 | Iwauchi et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0195522 A1 | 8/2006 | Miyazaki |
| 2006/0197755 A1 | 9/2006 | Bawany |
| 2006/0215244 A1 | 9/2006 | Yosha et al. |
| 2006/0227393 A1 | 10/2006 | Herloski |
| 2006/0238510 A1 | 10/2006 | Panotopoulos et al. |
| 2006/0238550 A1 | 10/2006 | Page |
| 2006/0250381 A1* | 11/2006 | Geaghan ............ G06F 3/03545 345/179 |
| 2006/0254042 A1 | 11/2006 | Chou et al. |
| 2006/0261778 A1 | 11/2006 | Elizalde Rodarte |
| 2006/0262185 A1 | 11/2006 | Cha et al. |
| 2006/0279501 A1 | 12/2006 | Lu et al. |
| 2006/0287982 A1 | 12/2006 | Sheldon et al. |
| 2007/0002587 A1 | 1/2007 | Miyashita |
| 2007/0003267 A1 | 1/2007 | Shibutani |
| 2007/0019181 A1 | 1/2007 | Sinclair et al. |
| 2007/0024742 A1 | 2/2007 | Raskar et al. |
| 2007/0046625 A1 | 3/2007 | Yee |
| 2007/0047221 A1 | 3/2007 | Park |
| 2007/0051792 A1 | 3/2007 | Wheeler et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0076434 A1 | 4/2007 | Uehara et al. |
| 2007/0080813 A1 | 4/2007 | Melvin |
| 2007/0081091 A1 | 4/2007 | Pan et al. |
| 2007/0091638 A1 | 4/2007 | Ijzerman et al. |
| 2007/0114967 A1 | 5/2007 | Peng |
| 2007/0116929 A1 | 5/2007 | Fujimori et al. |
| 2007/0122027 A1 | 5/2007 | Kunita et al. |
| 2007/0126393 A1 | 6/2007 | Bersenev |
| 2007/0133156 A1 | 6/2007 | Ligtenberg et al. |
| 2007/0145945 A1 | 6/2007 | McGinley et al. |
| 2007/0161262 A1 | 7/2007 | Lloyd |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0188478 A1* | 8/2007 | Silverstein .......... G06F 3/03542 345/179 |
| 2007/0189667 A1 | 8/2007 | Wakita et al. |
| 2007/0194752 A1 | 8/2007 | McBurney |
| 2007/0200830 A1 | 8/2007 | Yamamoto |
| 2007/0201246 A1 | 8/2007 | Yeo et al. |
| 2007/0201859 A1 | 8/2007 | Sarrat |
| 2007/0217224 A1 | 9/2007 | Kao et al. |
| 2007/0220708 A1 | 9/2007 | Lewis |
| 2007/0222766 A1 | 9/2007 | Bolender |
| 2007/0234420 A1 | 10/2007 | Novotney et al. |
| 2007/0236408 A1 | 10/2007 | Yamaguchi et al. |
| 2007/0236467 A1 | 10/2007 | Marshall et al. |
| 2007/0236475 A1 | 10/2007 | Wherry |
| 2007/0236873 A1 | 10/2007 | Yukawa et al. |
| 2007/0247338 A1 | 10/2007 | Marchetto |
| 2007/0247432 A1 | 10/2007 | Oakley |
| 2007/0247800 A1 | 10/2007 | Smith et al. |
| 2007/0257821 A1 | 11/2007 | Son et al. |
| 2007/0260892 A1 | 11/2007 | Paul et al. |
| 2007/0263119 A1 | 11/2007 | Shum et al. |
| 2007/0271527 A1 | 11/2007 | Paas et al. |
| 2007/0274094 A1 | 11/2007 | Schultz et al. |
| 2007/0274095 A1 | 11/2007 | Destain |
| 2007/0274099 A1 | 11/2007 | Tai et al. |
| 2007/0283179 A1 | 12/2007 | Burnett et al. |
| 2008/0001924 A1 | 1/2008 | de los Reyes et al. |
| 2008/0002350 A1 | 1/2008 | Farrugia |
| 2008/0005423 A1 | 1/2008 | Jacobs et al. |
| 2008/0013809 A1 | 1/2008 | Zhu et al. |
| 2008/0018611 A1 | 1/2008 | Serban et al. |
| 2008/0019150 A1 | 1/2008 | Park et al. |
| 2008/0019684 A1 | 1/2008 | Shyu et al. |
| 2008/0030937 A1 | 2/2008 | Russo et al. |
| 2008/0037284 A1 | 2/2008 | Rudisill |
| 2008/0048654 A1 | 2/2008 | Takahashi et al. |
| 2008/0053222 A1 | 3/2008 | Ehrensvard et al. |
| 2008/0059888 A1 | 3/2008 | Dunko |
| 2008/0061565 A1 | 3/2008 | Lee et al. |
| 2008/0068451 A1 | 3/2008 | Hyatt |
| 2008/0074398 A1 | 3/2008 | Wright |
| 2008/0084499 A1 | 4/2008 | Kisacanin et al. |
| 2008/0088593 A1 | 4/2008 | Smoot |
| 2008/0090626 A1 | 4/2008 | Griffin et al. |
| 2008/0104437 A1 | 5/2008 | Lee |
| 2008/0106592 A1 | 5/2008 | Mikami |
| 2008/0111518 A1 | 5/2008 | Toya |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0167832 A1 | 7/2008 | Soss |
| 2008/0174570 A1 | 7/2008 | Jobs et al. |
| 2008/0177185 A1 | 7/2008 | Nakao et al. |
| 2008/0179507 A2 | 7/2008 | Han |
| 2008/0180411 A1 | 7/2008 | Solomon et al. |
| 2008/0182622 A1 | 7/2008 | Makarowski et al. |
| 2008/0186660 A1 | 8/2008 | Yang |
| 2008/0186683 A1 | 8/2008 | Ligtenberg et al. |
| 2008/0203277 A1 | 8/2008 | Warszauer et al. |
| 2008/0211787 A1 | 9/2008 | Nakao et al. |
| 2008/0219025 A1 | 9/2008 | Spitzer et al. |
| 2008/0225205 A1 | 9/2008 | Travis |
| 2008/0228969 A1 | 9/2008 | Cheah et al. |
| 2008/0232061 A1 | 9/2008 | Wang et al. |
| 2008/0233326 A1 | 9/2008 | Hegemier et al. |
| 2008/0238884 A1 | 10/2008 | Harish |
| 2008/0253822 A1 | 10/2008 | Matias |
| 2008/0258679 A1 | 10/2008 | Manico et al. |
| 2008/0297878 A1 | 12/2008 | Brown et al. |
| 2008/0303479 A1 | 12/2008 | Park et al. |
| 2008/0309636 A1 | 12/2008 | Feng et al. |
| 2008/0316002 A1 | 12/2008 | Brunet et al. |
| 2008/0316768 A1 | 12/2008 | Travis |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0013275 A1 | 1/2009 | May et al. |
| 2009/0033623 A1 | 2/2009 | Lin |
| 2009/0040426 A1 | 2/2009 | Mather et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0096738 A1 | 4/2009 | Chen et al. |
| 2009/0102419 A1 | 4/2009 | Gwon et al. |
| 2009/0127005 A1 | 5/2009 | Zachut et al. |
| 2009/0131134 A1 | 5/2009 | Baerlocher et al. |
| 2009/0134838 A1 | 5/2009 | Raghuprasad |
| 2009/0135142 A1 | 5/2009 | Fu et al. |
| 2009/0135318 A1 | 5/2009 | Tateuchi et al. |
| 2009/0140985 A1 | 6/2009 | Liu |
| 2009/0142020 A1 | 6/2009 | Van Ostrand et al. |

(56) References Cited

U.S. PATENT DOCUMENTS

| | | |
|---|---|---|
| 2009/0146975 A1* | 6/2009 | Chang ............... G06F 3/03545 345/179 |
| 2009/0146992 A1 | 6/2009 | Fukunaga et al. |
| 2009/0147102 A1 | 6/2009 | Kakinuma et al. |
| 2009/0152748 A1 | 6/2009 | Wang et al. |
| 2009/0158221 A1 | 6/2009 | Nielsen et al. |
| 2009/0160944 A1 | 6/2009 | Trevelyan et al. |
| 2009/0161385 A1 | 6/2009 | Parker et al. |
| 2009/0163147 A1 | 6/2009 | Steigerwald et al. |
| 2009/0167728 A1* | 7/2009 | Geaghan et al. ............... 345/179 |
| 2009/0167930 A1 | 7/2009 | Safaee-Rad et al. |
| 2009/0182901 A1 | 7/2009 | Callaghan et al. |
| 2009/0189974 A1 | 7/2009 | Deering |
| 2009/0195497 A1 | 8/2009 | Fitzgerald et al. |
| 2009/0200384 A1 | 8/2009 | Masalkar |
| 2009/0219250 A1 | 9/2009 | Ure |
| 2009/0231275 A1 | 9/2009 | Odgers |
| 2009/0231465 A1 | 9/2009 | Senba |
| 2009/0239586 A1 | 9/2009 | Boeve et al. |
| 2009/0244832 A1 | 10/2009 | Behar et al. |
| 2009/0251008 A1 | 10/2009 | Sugaya |
| 2009/0251623 A1* | 10/2009 | Koyama ............... G06F 3/03545 348/789 |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0268386 A1 | 10/2009 | Lin |
| 2009/0276734 A1 | 11/2009 | Taylor et al. |
| 2009/0284613 A1 | 11/2009 | Kim |
| 2009/0285491 A1 | 11/2009 | Ravenscroft et al. |
| 2009/0296331 A1 | 12/2009 | Choy |
| 2009/0303137 A1 | 12/2009 | Kusaka et al. |
| 2009/0303204 A1 | 12/2009 | Nasiri et al. |
| 2009/0316072 A1 | 12/2009 | Okumura et al. |
| 2009/0320244 A1 | 12/2009 | Lin |
| 2009/0321490 A1 | 12/2009 | Groene et al. |
| 2009/0322278 A1 | 12/2009 | Franks et al. |
| 2010/0001963 A1 | 1/2010 | Doray et al. |
| 2010/0013319 A1 | 1/2010 | Kamiyama et al. |
| 2010/0013738 A1 | 1/2010 | Covannon et al. |
| 2010/0026656 A1 | 2/2010 | Hotelling et al. |
| 2010/0038821 A1 | 2/2010 | Jenkins et al. |
| 2010/0045540 A1 | 2/2010 | Lai et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0075517 A1 | 3/2010 | Ni et al. |
| 2010/0077237 A1 | 3/2010 | Sawyers |
| 2010/0079861 A1 | 4/2010 | Powell |
| 2010/0081377 A1 | 4/2010 | Chatterjee et al. |
| 2010/0083108 A1 | 4/2010 | Rider et al. |
| 2010/0085321 A1 | 4/2010 | Pundsack |
| 2010/0102182 A1 | 4/2010 | Lin |
| 2010/0102206 A1 | 4/2010 | Cazaux et al. |
| 2010/0103112 A1 | 4/2010 | Yoo et al. |
| 2010/0103131 A1 | 4/2010 | Segal et al. |
| 2010/0103332 A1 | 4/2010 | Li et al. |
| 2010/0117993 A1 | 5/2010 | Kent |
| 2010/0123686 A1 | 5/2010 | Klinghult et al. |
| 2010/0128112 A1 | 5/2010 | Marti et al. |
| 2010/0133398 A1 | 6/2010 | Chiu et al. |
| 2010/0135036 A1 | 6/2010 | Matsuba et al. |
| 2010/0142130 A1 | 6/2010 | Wang et al. |
| 2010/0144073 A1 | 6/2010 | Chaum et al. |
| 2010/0149111 A1 | 6/2010 | Olien |
| 2010/0149117 A1 | 6/2010 | Chien et al. |
| 2010/0149134 A1 | 6/2010 | Westerman et al. |
| 2010/0149377 A1 | 6/2010 | Shintani et al. |
| 2010/0154171 A1 | 6/2010 | Lombardi et al. |
| 2010/0156798 A1 | 6/2010 | Archer |
| 2010/0156913 A1 | 6/2010 | Ortega et al. |
| 2010/0157085 A1 | 6/2010 | Sasaki |
| 2010/0161522 A1 | 6/2010 | Tirpak et al. |
| 2010/0162109 A1 | 6/2010 | Chatterjee et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0206644 A1 | 8/2010 | Yeh |
| 2010/0214214 A1* | 8/2010 | Corson et al. ............... 345/158 |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0235546 A1 | 9/2010 | Terlizzi et al. |
| 2010/0237970 A1 | 9/2010 | Liu |
| 2010/0238075 A1 | 9/2010 | Pourseyed |
| 2010/0238138 A1 | 9/2010 | Goertz et al. |
| 2010/0238270 A1 | 9/2010 | Bjelkhagen et al. |
| 2010/0238320 A1 | 9/2010 | Washisu |
| 2010/0238620 A1 | 9/2010 | Fish |
| 2010/0245221 A1 | 9/2010 | Khan |
| 2010/0245289 A1 | 9/2010 | Svajda |
| 2010/0250988 A1 | 9/2010 | Okuda et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0282953 A1 | 11/2010 | Tam |
| 2010/0289457 A1 | 11/2010 | Onnerud et al. |
| 2010/0291331 A1 | 11/2010 | Schaefer |
| 2010/0295812 A1 | 11/2010 | Burns et al. |
| 2010/0296163 A1 | 11/2010 | Saarikko |
| 2010/0299642 A1 | 11/2010 | Merrell et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0315774 A1 | 12/2010 | Walker et al. |
| 2010/0321301 A1 | 12/2010 | Casparian et al. |
| 2010/0321339 A1 | 12/2010 | Kimmel |
| 2010/0321482 A1 | 12/2010 | Cleveland |
| 2010/0321877 A1 | 12/2010 | Moser |
| 2010/0322479 A1 | 12/2010 | Cleveland |
| 2010/0324457 A1 | 12/2010 | Bean et al. |
| 2010/0325155 A1 | 12/2010 | Skinner et al. |
| 2010/0331059 A1 | 12/2010 | Apgar et al. |
| 2011/0002577 A1 | 1/2011 | Van Ostrand |
| 2011/0007047 A1 | 1/2011 | Fujioka et al. |
| 2011/0012866 A1 | 1/2011 | Keam |
| 2011/0012873 A1 | 1/2011 | Prest et al. |
| 2011/0018799 A1* | 1/2011 | Lin ............... G06F 3/03545 345/157 |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0036965 A1 | 2/2011 | Zhang et al. |
| 2011/0037721 A1 | 2/2011 | Cranfill et al. |
| 2011/0043142 A1 | 2/2011 | Travis |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0044582 A1 | 2/2011 | Travis et al. |
| 2011/0050946 A1 | 3/2011 | Lee et al. |
| 2011/0055407 A1 | 3/2011 | Lydon et al. |
| 2011/0057899 A1 | 3/2011 | Sleeman et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0075440 A1* | 3/2011 | Wang ............... G06F 3/03545 362/553 |
| 2011/0081946 A1 | 4/2011 | Singh et al. |

(56) References Cited

U.S. PATENT DOCUMENTS

| | | | |
|---|---|---|---|
| 2011/0095994 A1 | 4/2011 | Birnbaum | |
| 2011/0096035 A1 | 4/2011 | Shen | |
| 2011/0096513 A1 | 4/2011 | Kim | |
| 2011/0102326 A1 | 5/2011 | Casparian et al. | |
| 2011/0102356 A1 | 5/2011 | Kemppinen et al. | |
| 2011/0115747 A1 | 5/2011 | Powell et al. | |
| 2011/0118025 A1 | 5/2011 | Lukas et al. | |
| 2011/0122071 A1 | 5/2011 | Powell | |
| 2011/0134032 A1 | 6/2011 | Chiu et al. | |
| 2011/0134112 A1 | 6/2011 | Koh et al. | |
| 2011/0157046 A1 | 6/2011 | Lee et al. | |
| 2011/0157087 A1 | 6/2011 | Kanehira et al. | |
| 2011/0157101 A1* | 6/2011 | Chang | G06F 3/03545 345/179 |
| 2011/0163955 A1 | 7/2011 | Nasiri et al. | |
| 2011/0164370 A1 | 7/2011 | McClure et al. | |
| 2011/0167181 A1 | 7/2011 | Minoo et al. | |
| 2011/0167287 A1 | 7/2011 | Walsh et al. | |
| 2011/0167391 A1 | 7/2011 | Momeyer et al. | |
| 2011/0167992 A1 | 7/2011 | Eventoff et al. | |
| 2011/0169762 A1 | 7/2011 | Weiss | |
| 2011/0169778 A1 | 7/2011 | Nungester et al. | |
| 2011/0170289 A1 | 7/2011 | Allen et al. | |
| 2011/0176035 A1 | 7/2011 | Poulsen | |
| 2011/0179864 A1 | 7/2011 | Raasch et al. | |
| 2011/0181754 A1 | 7/2011 | Iwasaki | |
| 2011/0183120 A1 | 7/2011 | Sharygin et al. | |
| 2011/0184646 A1 | 7/2011 | Wong et al. | |
| 2011/0184824 A1 | 7/2011 | George et al. | |
| 2011/0193787 A1 | 8/2011 | Morishige et al. | |
| 2011/0193938 A1 | 8/2011 | Oderwald et al. | |
| 2011/0197156 A1 | 8/2011 | Strait et al. | |
| 2011/0199389 A1 | 8/2011 | Lu et al. | |
| 2011/0202878 A1 | 8/2011 | Park et al. | |
| 2011/0205372 A1 | 8/2011 | Miramontes | |
| 2011/0216039 A1 | 9/2011 | Chen et al. | |
| 2011/0216266 A1 | 9/2011 | Travis | |
| 2011/0221659 A1 | 9/2011 | King et al. | |
| 2011/0227913 A1 | 9/2011 | Hyndman | |
| 2011/0228462 A1 | 9/2011 | Dang | |
| 2011/0231682 A1 | 9/2011 | Kakish et al. | |
| 2011/0234502 A1 | 9/2011 | Yun et al. | |
| 2011/0234535 A1 | 9/2011 | Hung et al. | |
| 2011/0234881 A1 | 9/2011 | Wakabayashi et al. | |
| 2011/0235179 A1 | 9/2011 | Simmonds | |
| 2011/0242063 A1* | 10/2011 | Li | G06F 3/03545 345/179 |
| 2011/0242138 A1 | 10/2011 | Tribble | |
| 2011/0242298 A1 | 10/2011 | Bathiche et al. | |
| 2011/0242440 A1 | 10/2011 | Noma et al. | |
| 2011/0242670 A1 | 10/2011 | Simmonds | |
| 2011/0248152 A1 | 10/2011 | Svajda et al. | |
| 2011/0248920 A1 | 10/2011 | Larsen | |
| 2011/0248941 A1 | 10/2011 | Abdo et al. | |
| 2011/0261001 A1 | 10/2011 | Liu | |
| 2011/0261083 A1 | 10/2011 | Wilson | |
| 2011/0262001 A1 | 10/2011 | Bi et al. | |
| 2011/0267272 A1 | 11/2011 | Meyer et al. | |
| 2011/0267300 A1 | 11/2011 | Serban et al. | |
| 2011/0273475 A1 | 11/2011 | Herz et al. | |
| 2011/0290686 A1 | 12/2011 | Huang | |
| 2011/0291993 A1 | 12/2011 | Miyazaki | |
| 2011/0295697 A1 | 12/2011 | Boston et al. | |
| 2011/0297566 A1 | 12/2011 | Gallagher et al. | |
| 2011/0298919 A1 | 12/2011 | Maglaque | |
| 2011/0304577 A1 | 12/2011 | Brown | |
| 2011/0304815 A1 | 12/2011 | Newell | |
| 2011/0304962 A1 | 12/2011 | Su | |
| 2011/0306424 A1 | 12/2011 | Kazama et al. | |
| 2011/0310038 A1 | 12/2011 | Park et al. | |
| 2011/0314425 A1 | 12/2011 | Chiang | |
| 2011/0316807 A1 | 12/2011 | Corrion | |
| 2012/0002052 A1 | 1/2012 | Muramatsu et al. | |
| 2012/0007821 A1 | 1/2012 | Zaliva | |
| 2012/0008015 A1 | 1/2012 | Manabe | |
| 2012/0011462 A1 | 1/2012 | Westerman et al. | |
| 2012/0013519 A1 | 1/2012 | Hakansson et al. | |
| 2012/0019165 A1 | 1/2012 | Igaki et al. | |
| 2012/0019686 A1 | 1/2012 | Manabe | |
| 2012/0020112 A1 | 1/2012 | Fisher et al. | |
| 2012/0020556 A1 | 1/2012 | Manabe | |
| 2012/0021618 A1 | 1/2012 | Schultz | |
| 2012/0023459 A1 | 1/2012 | Westerman | |
| 2012/0024682 A1 | 2/2012 | Huang et al. | |
| 2012/0026048 A1 | 2/2012 | Vazquez et al. | |
| 2012/0032891 A1 | 2/2012 | Parivar | |
| 2012/0032917 A1 | 2/2012 | Yamaguchi | |
| 2012/0033369 A1 | 2/2012 | Wu et al. | |
| 2012/0044140 A1* | 2/2012 | Koyama | G06F 3/0325 345/157 |
| 2012/0044179 A1 | 2/2012 | Hudson | |
| 2012/0044379 A1 | 2/2012 | Manabe | |
| 2012/0047368 A1 | 2/2012 | Chinn et al. | |
| 2012/0050975 A1 | 3/2012 | Garelli et al. | |
| 2012/0062850 A1 | 3/2012 | Travis | |
| 2012/0068919 A1 | 3/2012 | Lauder et al. | |
| 2012/0069540 A1 | 3/2012 | Lauder et al. | |
| 2012/0071008 A1 | 3/2012 | Sessford | |
| 2012/0072167 A1 | 3/2012 | Cretella, Jr. et al. | |
| 2012/0075249 A1 | 3/2012 | Hoch | |
| 2012/0081316 A1 | 4/2012 | Sirpal et al. | |
| 2012/0087078 A1 | 4/2012 | Medica et al. | |
| 2012/0092279 A1 | 4/2012 | Martin | |
| 2012/0094257 A1 | 4/2012 | Pillischer et al. | |
| 2012/0099263 A1 | 4/2012 | Lin | |
| 2012/0099749 A1 | 4/2012 | Rubin et al. | |
| 2012/0102438 A1 | 4/2012 | Robinson et al. | |
| 2012/0105321 A1* | 5/2012 | Wang | G06F 3/0304 345/157 |
| 2012/0106082 A1 | 5/2012 | Wu et al. | |
| 2012/0113031 A1 | 5/2012 | Lee et al. | |
| 2012/0113223 A1 | 5/2012 | Hilliges et al. | |
| 2012/0113579 A1 | 5/2012 | Agata et al. | |
| 2012/0115553 A1 | 5/2012 | Mahe et al. | |
| 2012/0117409 A1 | 5/2012 | Lee et al. | |
| 2012/0127118 A1 | 5/2012 | Nolting et al. | |
| 2012/0127126 A1 | 5/2012 | Mattice et al. | |
| 2012/0127573 A1 | 5/2012 | Robinson et al. | |
| 2012/0133561 A1 | 5/2012 | Konanur et al. | |
| 2012/0133797 A1 | 5/2012 | Sato et al. | |
| 2012/0140396 A1 | 6/2012 | Zeliff et al. | |
| 2012/0145525 A1 | 6/2012 | Ishikawa | |
| 2012/0146943 A1 | 6/2012 | Fairley et al. | |
| 2012/0155015 A1 | 6/2012 | Govindasamy et al. | |
| 2012/0161406 A1 | 6/2012 | Mersky | |
| 2012/0162126 A1 | 6/2012 | Yuan et al. | |
| 2012/0162693 A1 | 6/2012 | Ito | |
| 2012/0170284 A1 | 7/2012 | Shedletsky | |
| 2012/0175487 A1 | 7/2012 | Goto | |
| 2012/0182242 A1 | 7/2012 | Lindahl et al. | |
| 2012/0182249 A1 | 7/2012 | Endo et al. | |
| 2012/0182743 A1 | 7/2012 | Chou | |
| 2012/0185803 A1 | 7/2012 | Wang et al. | |
| 2012/0188791 A1 | 7/2012 | Voloschenko et al. | |
| 2012/0194393 A1 | 8/2012 | Uttermann et al. | |
| 2012/0194448 A1 | 8/2012 | Rothkopf | |
| 2012/0195063 A1 | 8/2012 | Kim et al. | |
| 2012/0200532 A1 | 8/2012 | Powell et al. | |
| 2012/0200802 A1 | 8/2012 | Large | |
| 2012/0206937 A1 | 8/2012 | Travis et al. | |
| 2012/0223866 A1 | 9/2012 | Ayala Vazquez et al. | |
| 2012/0224073 A1 | 9/2012 | Miyahara | |
| 2012/0229634 A1 | 9/2012 | Laett et al. | |
| 2012/0235635 A1 | 9/2012 | Sato | |
| 2012/0235790 A1 | 9/2012 | Zhao et al. | |
| 2012/0235921 A1 | 9/2012 | Laubach | |
| 2012/0243102 A1 | 9/2012 | Takeda et al. | |
| 2012/0243165 A1 | 9/2012 | Chang et al. | |
| 2012/0246377 A1 | 9/2012 | Bhesania | |
| 2012/0249443 A1 | 10/2012 | Anderson et al. | |
| 2012/0256829 A1 | 10/2012 | Dodge | |
| 2012/0256959 A1 | 10/2012 | Ye et al. | |
| 2012/0268912 A1 | 10/2012 | Minami et al. | |
| 2012/0274811 A1 | 11/2012 | Bakin | |

(56) References Cited

U.S. PATENT DOCUMENTS

| | | |
|---|---|---|
| 2012/0278744 A1 | 11/2012 | Kozitsyn et al. |
| 2012/0284297 A1 | 11/2012 | Aguera-Arcas et al. |
| 2012/0287562 A1 | 11/2012 | Wu et al. |
| 2012/0300275 A1 | 11/2012 | Vilardell et al. |
| 2012/0312955 A1 | 12/2012 | Randolph |
| 2012/0323933 A1 | 12/2012 | He et al. |
| 2012/0326003 A1 | 12/2012 | Solow et al. |
| 2012/0328349 A1 | 12/2012 | Isaac et al. |
| 2013/0009413 A1 | 1/2013 | Chiu et al. |
| 2013/0016468 A1 | 1/2013 | Oh |
| 2013/0017696 A1 | 1/2013 | Alvarez Rivera |
| 2013/0021289 A1 | 1/2013 | Chen et al. |
| 2013/0027354 A1 | 1/2013 | Yabuta et al. |
| 2013/0027356 A1* | 1/2013 | Nishida .................. G06F 3/042 345/175 |
| 2013/0027867 A1 | 1/2013 | Lauder et al. |
| 2013/0044074 A1 | 2/2013 | Park et al. |
| 2013/0046397 A1 | 2/2013 | Fadell et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0083466 A1 | 4/2013 | Becze et al. |
| 2013/0088431 A1 | 4/2013 | Ballagas et al. |
| 2013/0100008 A1 | 4/2013 | Marti et al. |
| 2013/0100082 A1 | 4/2013 | Bakin et al. |
| 2013/0106766 A1 | 5/2013 | Yilmaz et al. |
| 2013/0106813 A1 | 5/2013 | Hotelling et al. |
| 2013/0107144 A1 | 5/2013 | Marhefka et al. |
| 2013/0120466 A1 | 5/2013 | Chen et al. |
| 2013/0120760 A1 | 5/2013 | Raguin et al. |
| 2013/0127980 A1 | 5/2013 | Haddick et al. |
| 2013/0128102 A1 | 5/2013 | Yano |
| 2013/0154959 A1 | 6/2013 | Lindsay et al. |
| 2013/0155723 A1 | 6/2013 | Coleman |
| 2013/0162554 A1 | 6/2013 | Lauder et al. |
| 2013/0172906 A1 | 7/2013 | Olson et al. |
| 2013/0182246 A1 | 7/2013 | Tanase |
| 2013/0187753 A1 | 7/2013 | Chiriyankandath |
| 2013/0201094 A1 | 8/2013 | Travis |
| 2013/0212483 A1 | 8/2013 | Brakensiek et al. |
| 2013/0216108 A1 | 8/2013 | Hwang et al. |
| 2013/0217451 A1 | 8/2013 | Komiyama et al. |
| 2013/0222272 A1 | 8/2013 | Martin, Jr. |
| 2013/0222274 A1 | 8/2013 | Mori et al. |
| 2013/0222323 A1 | 8/2013 | McKenzie |
| 2013/0222353 A1 | 8/2013 | Large |
| 2013/0222681 A1 | 8/2013 | Wan |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228435 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229356 A1 | 9/2013 | Marwah |
| 2013/0229357 A1 | 9/2013 | Powell |
| 2013/0229363 A1 | 9/2013 | Whitman |
| 2013/0229366 A1 | 9/2013 | Dighde |
| 2013/0229380 A1 | 9/2013 | Lutz, III |
| 2013/0229386 A1 | 9/2013 | Bathiche |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0242495 A1 | 9/2013 | Bathiche et al. |
| 2013/0262886 A1 | 10/2013 | Nishimura |
| 2013/0278552 A1 | 10/2013 | Kamin-Lyndgaard |
| 2013/0283212 A1 | 10/2013 | Zhu et al. |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0304944 A1 | 11/2013 | Young |
| 2013/0307935 A1 | 11/2013 | Rappel et al. |
| 2013/0308339 A1 | 11/2013 | Woodgate et al. |
| 2013/0322000 A1 | 12/2013 | Whitt |
| 2013/0322001 A1 | 12/2013 | Whitt |
| 2013/0328761 A1 | 12/2013 | Boulanger |
| 2013/0329301 A1 | 12/2013 | Travis |
| 2013/0329360 A1 | 12/2013 | Aldana |
| 2013/0332628 A1 | 12/2013 | Panay |
| 2013/0335330 A1 | 12/2013 | Lane |
| 2013/0335387 A1 | 12/2013 | Emerton |
| 2013/0335902 A1 | 12/2013 | Campbell |
| 2013/0335903 A1 | 12/2013 | Raken |
| 2013/0339757 A1 | 12/2013 | Reddy |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0012401 A1 | 1/2014 | Perek |
| 2014/0022629 A1 | 1/2014 | Powell |
| 2014/0043275 A1 | 2/2014 | Whitman |
| 2014/0048399 A1 | 2/2014 | Whitt, III |
| 2014/0049894 A1 | 2/2014 | Rihn |
| 2014/0053108 A1 | 2/2014 | Johansson |
| 2014/0055624 A1 | 2/2014 | Gaines |
| 2014/0063198 A1 | 3/2014 | Boulanger |
| 2014/0078063 A1 | 3/2014 | Bathiche |
| 2014/0098085 A1 | 4/2014 | Lee |
| 2014/0118241 A1 | 5/2014 | Chai |
| 2014/0119802 A1 | 5/2014 | Shaw |
| 2014/0123273 A1 | 5/2014 | Matus |
| 2014/0125864 A1 | 5/2014 | Rihn |
| 2014/0131000 A1 | 5/2014 | Bornemann et al. |
| 2014/0132550 A1 | 5/2014 | McCracken et al. |
| 2014/0135060 A1 | 5/2014 | Mercer |
| 2014/0148938 A1 | 5/2014 | Zhang |
| 2014/0155031 A1 | 6/2014 | Lee et al. |
| 2014/0155123 A1 | 6/2014 | Lee et al. |
| 2014/0185215 A1 | 7/2014 | Whitt |
| 2014/0185220 A1 | 7/2014 | Whitt |
| 2014/0194095 A1 | 7/2014 | Wynne et al. |
| 2014/0196143 A1 | 7/2014 | Fliderman et al. |
| 2014/0258937 A1 | 9/2014 | Lee |
| 2014/0283142 A1 | 9/2014 | Shepherd et al. |
| 2014/0362506 A1 | 12/2014 | Whitt, III et al. |
| 2014/0372914 A1 | 12/2014 | Byrd et al. |
| 2014/0378099 A1 | 12/2014 | Huang et al. |
| 2014/0379942 A1 | 12/2014 | Perek et al. |
| 2015/0005953 A1 | 1/2015 | Fadell et al. |
| 2015/0020122 A1 | 1/2015 | Shin et al. |
| 2015/0026092 A1 | 1/2015 | Abboud et al. |
| 2015/0070119 A1 | 3/2015 | Rihn et al. |
| 2015/0086174 A1 | 3/2015 | Abecassis et al. |
| 2015/0117444 A1 | 4/2015 | Sandblad et al. |
| 2015/0161834 A1 | 6/2015 | Spahl et al. |
| 2015/0172264 A1 | 6/2015 | Hardy |
| 2015/0243236 A1 | 8/2015 | Jain et al. |
| 2015/0261262 A1 | 9/2015 | Whitt, III et al. |
| 2016/0034284 A1 | 2/2016 | Won et al. |
| 2016/0034424 A1 | 2/2016 | Won |

(56) References Cited

U.S. PATENT DOCUMENTS

| | | |
|---|---|---|
| 2016/0034695 A1 | 2/2016 | Won et al. |
| 2016/0037481 A1 | 2/2016 | Won et al. |

FOREIGN PATENT DOCUMENTS

| | | |
|---|---|---|
| CN | 1515937 | 7/2004 |
| CN | 1650202 | 8/2005 |
| CN | 1700072 | 11/2005 |
| CN | 1787605 | 6/2006 |
| CN | 1920642 | 2/2007 |
| CN | 101038401 | 9/2007 |
| CN | 101366001 | 2/2009 |
| CN | 101473167 | 7/2009 |
| CN | 101512403 | 8/2009 |
| CN | 101644979 | 2/2010 |
| CN | 101688991 | 3/2010 |
| CN | 101889225 | 11/2010 |
| CN | 101893785 | 11/2010 |
| CN | 202441167 | 9/2012 |
| CN | 103455149 | 12/2013 |
| EP | 0271956 | 6/1988 |
| EP | 1223722 | 7/2002 |
| EP | 1425763 | 6/2004 |
| EP | 1591891 | 11/2005 |
| EP | 2353978 | 8/2011 |
| EP | 2378607 | 10/2011 |
| EP | 2381290 | 10/2011 |
| EP | 2618247 | 7/2013 |
| GB | 2123213 | 1/1984 |
| GB | 2178570 | 2/1987 |
| GB | 2410116 | 7/2005 |
| GB | 2428101 | 1/2007 |
| JP | 56108127 | 8/1981 |
| JP | H07218865 | 8/1995 |
| JP | H0980354 | 3/1997 |
| JP | H09178949 | 7/1997 |
| JP | H104540 | 1/1998 |
| JP | H10234057 | 9/1998 |
| JP | 10301055 | 11/1998 |
| JP | 10326124 | 12/1998 |
| JP | 1173239 | 3/1999 |
| JP | 2000106021 | 4/2000 |
| JP | 2001174746 | 6/2001 |
| JP | 2002100226 | 4/2002 |
| JP | 2002162912 | 6/2002 |
| JP | 2002300438 | 10/2002 |
| JP | 2003215349 | 7/2003 |
| JP | 2004171948 | 6/2004 |
| JP | 3602207 | 12/2004 |
| JP | 2005077437 | 3/2005 |
| JP | 2005156932 | 5/2005 |
| JP | 2005331565 | 12/2005 |
| JP | 2006004877 | 1/2006 |
| JP | 2006160155 | 6/2006 |
| JP | 2006278251 | 10/2006 |
| JP | 2006294361 | 10/2006 |
| JP | 2006310269 | 11/2006 |
| JP | 2007184286 | 7/2007 |
| JP | 2007273288 | 10/2007 |
| JP | 2008066152 | 3/2008 |
| JP | 2008286874 | 7/2008 |
| JP | 2008529251 | 7/2008 |
| JP | 2009003053 | 1/2009 |
| JP | 2009059583 | 3/2009 |
| JP | 2009122551 | 6/2009 |
| JP | 2010151951 | 7/2010 |
| KR | 20010039013 | 5/2001 |
| KR | 20040066647 | 7/2004 |
| KR | 20080006404 | 1/2008 |
| KR | 20080009490 | 1/2008 |
| KR | 20080055051 | 6/2008 |
| KR | 20110064265 | 6/2011 |
| KR | 1020110087178 | 8/2011 |
| NL | 1038411 | 5/2012 |
| WO | WO-9108915 | 6/1991 |
| WO | WO-9964784 | 12/1999 |
| WO | WO-0079327 | 12/2000 |
| WO | WO-0128309 | 4/2001 |
| WO | WO-0172037 | 9/2001 |
| WO | WO-03048635 | 6/2003 |
| WO | WO-03083530 | 9/2003 |
| WO | WO-03106134 | 12/2003 |
| WO | WO-2005027696 | 3/2005 |
| WO | WO-2005059874 | 6/2005 |
| WO | WO-2006044818 | 4/2006 |
| WO | WO-2006082444 | 8/2006 |
| WO | WO-2007094304 | 8/2007 |
| WO | WO-2007103631 | 9/2007 |
| WO | WO-2007123202 | 11/2007 |
| WO | WO-2008013146 | 1/2008 |
| WO | WO-2008038016 | 4/2008 |
| WO | WO-2008055039 | 5/2008 |
| WO | WO-2009034484 | 3/2009 |
| WO | WO-2010011983 | 1/2010 |
| WO | WO-2010105272 | 9/2010 |
| WO | WO-2010147609 | 12/2010 |
| WO | WO-2011016200 | 2/2011 |
| WO | WO-2012036717 | 3/2012 |
| WO | WO-2012063410 | 5/2012 |
| WO | WO-2012174364 | 12/2012 |
| WO | WO-2013012699 | 1/2013 |
| WO | WO-2013033067 | 3/2013 |
| WO | WO-2013033274 | 3/2013 |
| WO | WO-2013163347 | 10/2013 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cholesteric Liquid Crystal", Retrieved from: <http://en.wikipedia.org/wiki/Cholesteric_liquid_crystal> on Aug. 6, 2012,(Jun. 10, 2012), 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.

"Developing Next-Generation Human Interfaces using Capacitive and Infrared Proximity Sensing", *Silicon Laboratories, Inc.*, Available at <http://www.silabs.com/pages/DownloadDoc.aspx?FILEURL=support%20documents/techinicaldocs/capacitive%20and%20proximity%20sensing_wp.pdf&src=SearchResults>,(Aug. 30, 2010), pp. 1-10.

"Directional Backlighting for Display Panels", U.S. Appl. No. 13/021,448, (Feb. 4, 2011), 38 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, 4 pages.

"First One Handed Fabric Keyboard with Bluetooth Wireless Technology", Retrieved from: <http://press.xtvworld.com/article3817.html> on May 8, 2012,(Jan. 6, 2005), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"How to Use the iPad's Onscreen Keyboard", Retrieved from <http://www.dummies.com/how-to/content/how-to-use-the-ipads-on screen-keyboard.html> on Aug. 28, 2012, 3 pages.

"i-Interactor electronic pen", Retrieved from: <http://www.alibaba.com/product-gs/331004878/i_Interactor_electronic_pen.html> on Jun. 19, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"Membrane Keyboards & Membrane Keypads", Retrieved from: <http://www.pannam.com/> on May 9, 2012,(Mar. 4, 2009), 2 pages.

(56) References Cited

OTHER PUBLICATIONS

"Motion Sensors", *Android Developers*, retrieved from <http://developer.android.com/guide/topics/sensors/sensors_motion.html< on May 25, 2012, 7 pages.

"MPC Fly Music Production Controller", *AKAI Professional*, Retrieved from: <http://www.akaiprompc.com/mpc-fly> Jul. 9, 12, 4 pages.

"NI Releases New Machine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/021,448, (Dec. 13, 2012), 9 pages.

"Non-Final Office Action", U.S. Appl. No. 13/471,001, (Feb. 19, 2013), 15 pages.

"Non-Final Office Action", U.S. Appl. No. 13/471,139, (Mar. 21, 2013), 12 pages.

"Non-Final Office Action", U.S. Appl. No. 13/471,202, (Feb. 11, 2013), 10 pages.

"Non-Final Office Action", U.S. Appl. No. 13/471,336, (Jan. 18, 2013), 14 pages.

"Non-Final Office Action", U.S. Appl. No. 13/651,195, (Jan. 2, 2013), 14 pages.

"Non-Final Office Action", U.S. Appl. No. 13/651,232, (Jan. 17, 2013), 15 pages.

"Non-Final Office Action", U.S. Appl. No. 13/651,272, (Feb. 12, 2013), 10 pages.

"Non-Final Office Action", U.S. Appl. No. 13/651,287, (Jan. 29, 2013), 13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013), 14 pages.

"Non-Final Office Action", U.S. Appl. No. 13/651,976, (Feb. 22, 2013), 16 pages.

"Non-Final Office Action", U.S. Appl. No. 13/653,321, (Feb. 1, 2013), 13 pages.

"Non-Final Office Action", U.S. Appl. No. 13/653,682, (Feb. 7, 2013), 11 pages.

"Notice of Allowance", U.S. Appl. No. 13/470,633, (Mar. 22, 2013), 7 pages.

"On-Screen Keyboard for Windows 7, Vista, XP with Touchscreen", Retrieved from <www.comfort-software.com/on-screen-keyboard.html> on Aug. 28, 2012, (Feb. 2, 2011), 3 pages.

"Optical Sensors in Smart Mobile Devices", *ON Semiconductor, TND415/D*, Available at <http://www.onsemi.jp/pub_link/Collateral/TND415-D.PDF>,(Nov. 2010), pp. 1-13.

"Optics for Displays: Waveguide-based Wedge Creates Collimated Display Backlight", *OptoIQ*, retrieved from <http://www.optoiq.com/index/photonics-technologies-applications/lfw-display/lfw-article-display-articles.laser-focus-world.volume-46.issue-1.world-news.optics-for_displays.html> Nov. 2, 2010,(Jan. 1, 2010), 3 pages.

"Position Sensors", *Android Developers*, retrieved from <http://developer.android.com/guide/topics/sensors/sensors_position.html> on May 25, 2012, 5 pages.

"Reflex LCD Writing Tablets", retrieved from <http://www.kentdisplays.com/products/lcdwritingtablets.html> on Jun. 27, 2012, 3 pages "Restriction Requirement", U.S. Appl. No. 13/471,139, (Jan. 17, 2013), 7 pages.

"Restriction Requirement", U.S. Appl. No. 13/651,304, (Jan. 18, 2013), 7 pages.

"Restriction Requirement", U.S. Appl. No. 13/651,726, (Feb. 22, 2013), 6 pages.

"Restriction Requirement", U.S. Appl. No. 13/651,871, (Feb. 7, 2013),6 pages.

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>,(2009), 2 pages.

"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012,(2011), 4 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008), 11 Pages.

"Virtualization Getting Started Guide", *Red Hat Enterprise Linux 6, Edition 0.2*, retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> on May 29, 2012,(Oct. 19, 2008), 4 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Das, Apurba et al., "Study of Heat Transfer through Multilayer Clothing Assemblies: A Theoretical Prediction", Retrieved from <http://www.autexrj.com/cms/zalaczone_pliki/5_013_11.pdf>, (Jun. 2011), 7 pages.

Dietz, Paul H., et al., "A Practical Pressure Sensitive Computer Keyboard", In Proceedings of UIST 2009,(Oct. 2009), 4 pages.

Gaver, William W., et al., "A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012,(May 7, 1995), 9 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Hanlon, Mike "ElekTex Smart Fabric Keyboard Goes Wireless", Retrieved from: <http://www.gizmag.com/go/5048/ > on May 7, 2012,(Jan. 15, 2006), 5 pages.

Harada, Susumu et al., "VoiceDraw: A Hands-Free Voice-Driven Drawing Application for People With Motor Impairments", *In Proceedings of Ninth International ACM SIGACCESS Conference on Computers and Accessibility*, retrieved from <http://citeseerx.ist.psu.edu/viewdoc/download?doi=10.1.1.113.7211&rep=rep1&type=pdf> on Jun. 1, 2012,(Oct. 15, 2007), 8 pages.

Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> *Proceedings: Journal of Microelectromechanical Systems*, (Dec. 2005), 7 pages.

Kaufmann, Benoit et al., "Hand Posture Recognition Using Real-time Artificial Evolution", *EvoApplications'09* , retrieved from <http://evelyne.lutton.free.fr/Papers/KaufmannEvolASP2010.pdf> Jan. 5, 2012,(Apr. 3, 2010),10 pages.

(56) References Cited

OTHER PUBLICATIONS

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

Manresa-Yee, Cristina et al., "Experiences Using a Hands-Free Interface", *In Proceedings of the 10th International ACM SIGACCESS Conference on Computers and Accessibility*, retrieved from <http://dmi.uib.es/~cmanresay/Research/%5BMan08%5DAssets08.pdf> on Jun. 1, 2012,(Oct. 18, 2008), pp. 261-262.

McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.

Nakanishi, Hideyuki et al., "Movable Cameras Enhance Social Telepresence in Media Spaces", *In Proceedings of the 27th International Conference on Human Factors in Computing Systems*, retrieved from <http://smg.ams.eng.osaka-u.ac.jp/~nakanishi/hnp_2009_chi.pdf> on Jun. 1, 2012,(Apr. 6, 2009), 10 pages.

Piltch, Avram "ASUS Eee Pad Slider SL101 Review", Retrieved from <http://www.laptopmag.com/review/tablets/asus-eee-pad-slider-sl101.aspx>, (Sep. 22, 2011), 5 pages.

Post, E.R. et al., "E-Broidery: Design and Fabrication of Textile-Based Computing", IBM Systems Journal, vol. 39, Issue 3 & 4,(Jul. 2000), pp. 840-860.

Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.

Qin, Yongqiang et al., "pPen: Enabling Authenticated Pen and Touch Interaction on Tabletop Surfaces", *In Proceedings of ITS 2010*, Available at <http://www.dfki.de/its2010/papers/pdf/po172.pdf>,(Nov. 2010), pp. 283-284.

Reilink, Rob et al., "Endoscopic Camera Control by Head Movements for Thoracic Surgery", *In Proceedings of 3rd IEEE RAS & EMBS International Conference of Biomedical Robotics and Biomechatronics*, retrieved from <http://doc.utwente.nl/74929/1/biorob_online.pdf> on Jun. 1, 2012,(Sep. 26, 2010), pp. 510-515.

Sumimoto, Mark "Touch & Write: Surface Computing With Touch and Pen Input", Retrieved from: <http://www.gottabemobile.com/2009/08/07/touch-write-surface-computing-with-touch-and-pen-input/> on Jun. 19, 2012,(Aug. 7, 2009), 4 pages.

Sundstedt, Veronica "Gazing at Games: Using Eye Tracking to Control Virtual Characters", *In ACM SIGGRAPH 2010 Courses*, retrieved from <http://www.tobii.com/Global/Analysis/Training/EyeTrackAwards/veronica_sundstedt.pdf> Jun. 1, 2012,(Jul. 28, 2010), 85 pages.

Takamatsu, Seiichi et al., "Flexible Fabric Keyboard with Conductive Polymer-Coated Fibers", In Proceedings of Sensors 2011,(Oct. 28, 2011), 4 pages.

Travis, Adrian et al., "Collimated Light from a Waveguide for a Display Backlight", *Optics Express*, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, 6 pages.

Travis, Adrian et al., "The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.

Valli, Alessandro "Notes on Natural Interaction", retrieved from <http://www.idemployee.id.tue.nl/g.w.m.rauterberg/lecturenotes/valli-2004.pdf> on Jan. 5, 2012,(Sep. 2005), 80 pages.

Valliath, G T., "Design of Hologram for Brightness Enhancement in Color LCDs", Retrieved from <http://www.loreti.it/Download/PDF/LCD/44_05.pdf> on Sep. 17, 2012, 5 pages.

Vaucelle, Cati "Scopemate, A Robotic Microscope!", *Architectradure*, retrieved from <http://architectradure.blogspot.com/2011/10/at-uist-this-monday-scopemate-robotic.html> on Jun. 6, 2012,(Oct. 17, 2011), 2 pages.

Williams, Jim "A Fourth Generation of LCD Backlight Technology", Retrieved from <http://cds.linear.com/docs/Application%20Note/an65f.pdf>, (Nov. 1995), 124 pages.

Xu, Zhang et al., "Hand Gesture Recognition and Virtual Game Control Based on 3D Accelerometer and EMG Sensors", *IUI'09*, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%/20accelerometer%20and%20EMG%20sensors.pdf> on Jan. 5, 2012,(Feb. 8, 2009), 5 pages.

Xu, Zhi-Gang et al., "Vision-based Detection of Dynamic Gesture", *ICTM'09*, Dec. 5-6, 2009, retrieved from <http://ieeexplore.ieee.org/stamp/stamp.jsp?tp=&arnumber=5412956> on Jan. 5, 2012,(Dec. 5, 2009), pp. 223-226.

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.

Zhu, Dingyun et al., "Keyboard before Head Tracking Depresses User Success in Remote Camera Control", *In Proceedings of 12th IFIP TC 13 International Conference on Human-Computer Interaction, Part II*, retrieved from <http://csiro.academia.edu/Departments/CSIRO_ICT_Centre/Papers?page=5> on Jun. 1, 2012,(Aug. 24, 2009), 14 pages.

"Final Office Action", U.S. Appl. No. 13/651,195, (Apr. 18, 2013), 13 pages.

"Non-Final Office Action", U.S. Appl. No. 13/563,435, (Jun. 14, 2013), 6 pages.

"Non-Final Office Action", U.S. Appl. No. 13/564,520, (Jun. 19, 2013), 8 pages.

"Non-Final Office Action", U.S. Appl. No. 13/565,124, (Jun. 17, 2013), 5 pages.

"Notice of Allowance", U.S. Appl. No. 13/471,202, (May 28, 2013), 7 pages.

"Notice of Allowance", U.S. Appl. No. 13/651,195, (Jul. 8, 2013), 9 pages.

"International Search Report and Written Opinion", Application No. PCT/US2013/043961, Oct. 17, 2013, 11 pages.

"Non-Final Office Action", U.S. Appl. No. 13/780,228, Oct. 30, 2013, 12 pages.

"Non-Final Office Action", U.S. Appl. No. 13/494,651, Feb. 4, 2014, 15 pages.

"Non-Final Office Action", U.S. Appl. No. 13/525,070, Jan. 17, 2014, 19 pages.

"Corrected Notice of Allowance", U.S. Appl. No. 13/563,435, Jan. 14, 2014, 2 pages.

"International Search Report", Application No. PCT/US2010/045676, Apr. 28, 2011, 2 Pages.

"Corrected Notice of Allowance", U.S. Appl. No. 13/563,435, Jan. 22, 2014, 2 pages.

"Non-Final Office Action", U.S. Appl. No. 13/021,448, Aug. 16, 2013, 25 pages.

"International Search Report", Application No. PCT/US2010/046129, Mar. 2, 2011, 3 Pages.

"What is the PD-Net Project About?", retrieved from <http://pd-net.org/about/> on Mar. 10, 2011, 3 pages.

"Real-Time Television Content Platform", retrieved from <http://www.accenture.com/us-en/pages/insight-real-time-television-platform.aspx> on Mar. 10, 2011, May 28, 2002, 3 pages.

"Notice of Allowance", U.S. Appl. No. 13/563,435, Nov. 12, 2013, 5 pages.

"Notice of Allowance", U.S. Appl. No. 13/565,124, Dec. 24, 2013, 6 pages.

(56) References Cited

OTHER PUBLICATIONS

"Final Office Action", U.S. Appl. No. 13/564,520, Jan. 15, 2014, 7 pages.

"International Search Report and Written Opinion", Application No. PCT/US2013/055679, Nov. 18, 2013, 8 pages.

Kim, et al.,' "A Controllable Viewing Angle LCD with an Optically isotropic liquid crystal", Journal of Physics D: Applied Physics, vol. 43, No. 14, Mar. 23, 2010, 7 Pages.

Lee, "Flat-panel Backlight for View-sequential 3D Display", Optoelectronics, IEE Proceedings—.vol. 151. No. 6 IET, Dec. 2004, 4 pages.

Travis, et al., "Flat Projection for 3-D", In Proceedings of the IEEE, vol. 94 Issue: 3, Available at <http://ieeexplore.ieee.org/stamp/stamp.jsp?tp=&arnumber=1605201>,Mar. 13, 2006, pp. 539-549.

Travis, et al.,' "P-127: Linearity in Flat Panel Wedge Projection", SID 03 Digest, retrieved from <http://www2.eng.cam.ac.uk/~arlt1/Linearity%20in%20flat%20panel%20wedge%20projection.pdf>,May 12, 2005, pp. 716-719.

Yagi, "The Concept of "AdapTV"", Series: The Challenge of "AdapTV", Broadcast Technology, No. 28, 2006, pp. 16-17.

"Advisory Action", U.S. Appl. No. 14/199,924, May 28, 2014, 2 pages.

"Corrected Notice of Allowance", U.S. Appl. No. 13/565,124, Mar. 10, 2014, 2 pages.

"Final Office Action", U.S. Appl. No. 13/494,651, Jun. 11, 2014, 19 pages.

"Final Office Action", U.S. Appl. No. 13/525,070, Apr. 24, 2014, 21 pages.

"Final Office Action", U.S. Appl. No. 14/199,924, May 6, 2014, 5 pages.

"Non-Final Office Action", U.S. Appl. No. 13/564,520, Jun. 16, 2014, 5 pages.

"Notice of Allowance", U.S. Appl. No. 13/471,237, May 12, 2014, 8 pages.

"Notice of Allowance", U.S. Appl. No. 14/018,286, May 23, 2014, 8 pages.

"Notice of Allowance", U.S. Appl. No. 14/199,924, Jun. 10, 2014, 4 pages.

"Supplemental Notice of Allowance", U.S. Appl. No. 14/018,286, Jun. 11, 2014, 5 pages.

"Corrected Notice of Allowance", U.S. Appl. No. 13/563,435, Mar. 20, 2014, 2 pages.

"Corrected Notice of Allowance", U.S. Appl. No. 13/565,124, Apr. 3, 2014, 4 pages.

"Corrected Notice of Allowance", U.S. Appl. No. 13/565,124, Apr. 14, 2014, 2 pages.

"Final Office Action", U.S. Appl. No. 13/021,448, Jan. 16, 2014, 33 Pages.

"Final Office Action", U.S. Appl. No. 13/780,228, Mar. 28, 2014, 13 pages.

"Non-Final Office Action", U.S. Appl. No. 13/471,237, Mar. 24, 2014, 7 pages.

"Non-Final Office Action", U.S. Appl. No. 13/564,520, Feb. 14, 2014, 5 pages.

"Non-Final Office Action", U.S. Appl. No. 14/199,924, Apr. 10, 2014, 6 pages.

"Non-Final Office Action", U.S. Appl. No. 14/200,595, Apr. 11, 2014, 4 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, Feb. 24, 2014, 2 pages.

"Apple®—45W MagSafe 2 Power Adapter with Magnetic DC Connector-", Retrieved from <http://www.bestbuy.com/site/Apple%26%23174%3B---45W-MagSafe-2-Power-Adapter-with-Magnetic-DC-Connector/5856526.p?id=1218696408860&skuId=5856526#tab=overview> on May 14, 2013, 2013, 4 Pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University,1999, 14 Pages.

"Can I Customize my Samsung Galaxy S® 4 Lock Screen? Which Features can I Access When the Device is Locked?", Retrieved From: <http://www.samsung.com/us/support/howtoguide/N0000006/10632/127767> Jul. 3, 2014, May 16, 2014, 12 Pages.

"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.

"Corrected Notice of Allowance", U.S. Appl. No. 13/470,633, Apr. 9, 2013, 2 pages.

"Corrected Notice of Allowance", U.S. Appl. No. 13/470,633, Jul. 2, 2013, 2 pages.

"Corrected Notice of Allowance", U.S. Appl. No. 13/651,327, Sep. 12, 2013, 2 pages.

"Corrected Notice of Allowance", U.S. Appl. No. 13/651,327, Sep. 23, 2013, 2 pages.

"Corrected Notice of Allowance", U.S. Appl. No. 13/651,726, Sep. 17, 2013, 2 pages.

"Corrected Notice of Allowance", U.S. Appl. No. 13/656,520, Jan. 16, 2014, 3 pages.

"Corrected Notice of Allowance", U.S. Appl. No. 13/715,133, Apr. 2, 2014, 2 pages.

"Corrected Notice of Allowance", U.S. Appl. No. 13/938,930, May 6, 2014, 2 pages.

"Corrected Notice of Allowance", U.S. Appl. No. 13/938,930, Jun. 6, 2014, 2 pages.

"Corrected Notice of Allowance", U.S. Appl. No. 13/939,002, May 22, 2014, 2 pages.

"Corrected Notice of Allowance", U.S. Appl. No. 13/939,002, Jun. 19, 2014, 2 pages.

"Corrected Notice of Allowance", U.S. Appl. No. 13/939,002, May 5, 2014, 2 pages.

"Corrected Notice of Allowance", U.S. Appl. No. 13/939,032, Jun. 26, 2014, 2 pages.

"Edwards 1508 Series Surface Wall Mount Electromagnetic Door Holder", Edwards Signaling, retrieved from <http://www.thesignalsource.com/documents/1508.pdf>, 2000, 1 page.

"Final Office Action", U.S. Appl. No. 12/163,614, Nov. 8, 2012, 15 pages.

"Final Office Action", U.S. Appl. No. 12/163,614, Aug. 19, 2011, 15 pages.

"Final Office Action", U.S. Appl. No. 13/408,257, Mar. 28, 2014, 17 pages.

"Final Office Action", U.S. Appl. No. 13/471,001, Jul. 25, 2013, 20 pages.

"Final Office Action", U.S. Appl. No. 13/471,139, Sep. 16, 2013, 13 pages.

"Final Office Action", U.S. Appl. No. 13/471,336, Aug. 28, 2013, 18 pages.

"Final Office Action", U.S. Appl. No. 13/603,918, Mar. 21, 2014, 14 pages.

"Final Office Action", U.S. Appl. No. 13/651,232, May 21, 2013, 21 pages.

"Final Office Action", U.S. Appl. No. 13/651,287, May 3, 2013, 16 pages.

"Final Office Action", U.S. Appl. No. 13/651,976, Jul. 25, 2013, 21 pages.

"Final Office Action", U.S. Appl. No. 13/653,321, Aug. 2, 2013, 17 pages.

"Final Office Action", U.S. Appl. No. 13/653,682, Jun. 11, 2014, 11 pages.

"Final Office Action", U.S. Appl. No. 13/653,682, Oct. 18, 2013, 16 pages.

"Final Office Action", U.S. Appl. No. 13/656,055, Oct. 23, 2013, 14 pages.

"Final Office Action", U.S. Appl. No. 13/938,930, Nov. 8, 2013, 10 pages.

"Final Office Action", U.S. Appl. No. 13/939,002, Nov. 8, 2013, 7 pages.

(56) References Cited

OTHER PUBLICATIONS

"Final Office Action", U.S. Appl. No. 13/939,032, Dec. 20, 2013, 5 pages.
"Final Office Action", U.S. Appl. No. 14/063,912, Apr. 29, 2014, 10 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"For Any Kind of Proceeding 2011 Springtime as Well as Coil Nailers as Well as Hotter Summer Season", Lady Shoe Worlds, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,Sep. 8, 2011, 2 pages.
"Foreign Notice of Allowance", CN Application No. 201320096755.7, Jan. 27, 2014, 2 pages.
"Foreign Office Action", CN Application No. 201110272868.3, Apr. 1, 2013, 10 pages.
"Foreign Office Action", CN Application No. 201320097066.8, Oct. 24, 2013, 5 Pages.
"Foreign Office Action", CN Application No. 201320097079.5, Sep. 26, 2013, 4 pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"iControlPad 2—The open source controller", Retrieved from <http://www.kickstarter.com/projects/1703567677/icontrolpad-2-the-open-source-controller> on Nov. 20, 2012, 2012, 15 pages.
"Interlink Electronics FSR (TM) Force Sensing Resistors (TM)", Retrieved at <<http://akizukidenshi.com/download/ds/ interlinkelec/94-00004+Rev+B%20FSR%201ntegration%20Guide.pdf on Mar. 21, 2013, 36 pages.
"International Search Report and Written Opinion", Application No. PCT/US2013/028479, Jun. 17, 2013, 10 pages.
"International Search Report and Written Opinion", Application No. PCT/US2014/031531, Jun. 20, 2014, 10 Pages.
"International Search Report and Written Opinion", Application No. PCT/US2013/051421, Dec. 6, 2013, 10 pages.
"International Search Report and Written Opinion", Application No. PCT/US2013/065154, Feb. 5, 2014, 10 pages.
"International Search Report and Written Opinion", Application No. PCT/US2014/020050, May 9, 2014, 10 pages.
"International Search Report and Written Opinion", Application No. PCT/US2013/028488, Jun. 24, 2014, 11 pages.
"International Search Report and Written Opinion", Application No. PCT/US2013/053683, Nov. 28, 2013, 11 pages.
"International Search Report and Written Opinion", Application No. PCT/US2014/016654, May 16, 2014, 11 pages.
"International Search Report and Written Opinion", Application No. PCT/US2013/028481, Jun. 19, 2014, 11 pages.
"International Search Report and Written Opinion", Application No. PCT/US2013/028948, Jun. 21, 2013, 11 pages.
"International Search Report and Written Opinion", Application No. PCT/US2013/029461, Jun. 21, 2013, 11 pages.
"International Search Report and Written Opinion", Application No. PCT/US2013/040968, Sep. 5, 2013, 11 pages.
"International Search Report and Written Opinion", Application No. PCT/US2013/067912, Feb. 13, 2014, 12 pages.
"International Search Report and Written Opinion", Application No. PCT/US2013/075180, May 6, 2014, 12 pages.
"International Search Report and Written Opinion", Application No. PCT/US2013/044871, Aug. 14, 2013, 12 pages.
"International Search Report and Written Opinion", Application No. PCT/US2013/042550, Sep. 24, 2013, 14 pages.
"International Search Report and Written Opinion", Application No. PCT/US2014/013928, May 12, 2014, 17 pages.
"International Search Report and Written Opinion", Application No. PCT/US2013/045283, Mar. 12, 2014, 19 pages.
"International Search Report and Written Opinion", Application No. PCT/US2011/050471, Apr. 9, 2012, 8 pages.
"International Search Report and Written Opinion", Application No. PCT/US2013/044873, Nov. 22, 2013, 9 pages.
"International Search Report and Written Opinion", Application No. PCT/US2013/063156, Dec. 5, 2013, 9 pages.
"International Search Report and Written Opinion", Application No. PCT/US2013/067905, Apr. 15, 2014, 9 pages.
"International Search Report and Written Opinion", Application No. PCT/US2013/042790, Aug. 8, 2013, 9 pages.
"International Search Report and Written Opinion", Application No. PCT/US2013/045049, Sep. 16, 2013, 9 pages.
"Lock Screen Overview (Windows Runtime Apps)", Retrieved From: <http://msdn.microsoft.com/en-in/library/windows/apps/hh779720.aspx> Jul. 8, 2014, Dec. 31, 2012, 5 Pages.
"Magnetic Cell Phone Holder", Extreme Computing, retrieved from <http://www.extremecomputing.com/magnetholder.html> on May 7, 2008, 1 page.
"Microsoft Develops Glasses-Free Eye-Tracking 3D Display", Tech-FAQ—retrieved from <http://www.tech-faq.com/microsoft-develops-glasses-free-eye-tracking-3d-display.html> on Nov. 2, 2011, Nov. 2, 2011, 3 pages.
"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, May 23, 2012, 9 pages.
"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.
"Molex:PCI Express Mini Card Connector, Right Angle, Low-Profile, Mid-Mount 0.80mm (.031") Pitch", Retrieved from <http://rhu004.sma-promail.com/SQLImages/kelmscott/Molex/PDF_Images/987650-4441.PDF> on Feb. 6, 2013, 2010, 3 pages.
"Non-Final Office Action", U.S. Appl. No. 13/409,967, Dec. 10, 2013, 5 pages.
"Non-Final Office Action", U.S. Appl. No. 13/599,635, Feb. 25, 2014, 13 pages.
"Non-Final Office Action", U.S. Appl. No. 12/163,614, Apr. 27, 2011, 15 pages.
"Non-Final Office Action", U.S. Appl. No. 12/163,614, May 24, 2012, 15 pages.
"Non-Final Office Action", U.S. Appl. No. 12/882,994, Feb. 1, 2013, 17 pages.
"Non-Final Office Action", U.S. Appl. No. 13/408,257, Dec. 5, 2013, 13 pages.
"Non-Final Office Action", U.S. Appl. No. 13/468,918, Dec. 26, 2013, 18 pages.
"Non-Final Office Action", U.S. Appl. No. 13/468,949, Jun. 20, 2014, 10 pages.
"Non-Final Office Action", U.S. Appl. No. 13/470,951, Jul. 2, 2014, 19 pages.
"Non-Final Office Action", U.S. Appl. No. 13/471,001, Jun. 17, 2014, 23 pages.
"Non-Final Office Action", U.S. Appl. No. 13/471,030, May 15, 2014, 10 pages.
"Non-Final Office Action", U.S. Appl. No. 13/471,054, Jun. 3, 2014, 15 pages.
"Non-Final Office Action", U.S. Appl. No. 13/471,186, Feb. 27, 2014, 8 pages.
"Non-Final Office Action", U.S. Appl. No. 13/471,336, May 7, 2014, 17 pages.
"Non-Final Office Action", U.S. Appl. No. 13/471,376, Apr. 2, 2014, 17 pages.
"Non-Final Office Action", U.S. Appl. No. 13/471,405, Feb. 20, 2014, 37 pages.
"Non-Final Office Action", U.S. Appl. No. 13/492,232, Apr. 30, 2014, 9 pages.
"Non-Final Office Action", U.S. Appl. No. 13/494,722, May 9, 2014, 8 pages.
"Non-Final Office Action", U.S. Appl. No. 13/527,263, Apr. 3, 2014, 6 pages.
"Non-Final Office Action", U.S. Appl. No. 13/527,263, Jul. 19, 2013, 5 pages.

(56) References Cited

OTHER PUBLICATIONS

"Non-Final Office Action", U.S. Appl. No. 13/595,700, Jun. 18, 2014, 8 pages.
"Non-Final Office Action", U.S. Appl. No. 13/599,763, May 28, 2014, 6 pages.
"Non-Final Office Action", U.S. Appl. No. 13/603,918, Dec. 19, 2013, 12 pages.
"Non-Final Office Action", U.S. Appl. No. 13/645,405, Jan. 31, 2014, 6 pages.
"Non-Final Office Action", U.S. Appl. No. 13/647,479, Jul. 3, 2014, 10 pages.
"Non-Final Office Action", U.S. Appl. No. 13/651,232, Dec. 5, 2013, 15 pages.
"Non-Final Office Action", U.S. Appl. No. 13/651,726, Apr. 15, 2013, 6 pages.
"Non-Final Office Action", U.S. Appl. No. 13/651,871, Jul. 1, 2013, 5 pages.
"Non-Final Office Action", U.S. Appl. No. 13/651,976, Jun. 16, 2014, 23 pages.
"Non-Final Office Action", U.S. Appl. No. 13/653,682, Feb. 26, 2014, 10 pages.
"Non-Final Office Action", U.S. Appl. No. 13/653,682, Jun. 3, 2013, 14 pages.
"Non-Final Office Action", U.S. Appl. No. 13/655,065, Apr. 24, 2014, 16 pages.
"Non-Final Office Action", U.S. Appl. No. 13/656,055, Mar. 12, 2014, 17 pages.
"Non-Final Office Action", U.S. Appl. No. 13/656,055, Apr. 23, 2013, 11 pages.
"Non-Final Office Action", U.S. Appl. No. 13/656,520, Feb. 1, 2013, 15 pages.
"Non-Final Office Action", U.S. Appl. No. 13/656,520, Jun. 5, 2013, 8 pages.
"Non-Final Office Action", U.S. Appl. No. 13/938,930, Aug. 29, 2013, 9 pages.
"Non-Final Office Action", U.S. Appl. No. 13/939,002, Aug. 28, 2013, 6 pages.
"Non-Final Office Action", U.S. Appl. No. 13/939,002, Dec. 20, 2013, 5 pages.
"Non-Final Office Action", U.S. Appl. No. 13/939,032, Aug. 29, 2013, 7 pages.
"Non-Final Office Action", U.S. Appl. No. 13/974,994, Jun. 4, 2014, 24 pages.
"Non-Final Office Action", U.S. Appl. No. 13/975,087, May 8, 2014, 18 pages.
"Non-Final Office Action", U.S. Appl. No. 14/063,912, Jan. 2, 2014, 10 pages.
"Non-Final Office Action", U.S. Appl. No. 14/225,250, Jun. 17, 2014, 5 pages.
"Non-Final Office Action", U.S. Appl. No. 14/225,276, Jun. 13, 2014, 6 pages.
"Non-Final Office Action", U.S. Appl. No. 14/277,240, Jun. 13, 2014, 6 pages.
"Notice of Allowance", U.S. Appl. No. 12/163,614, Apr. 3, 2013, 9 pages.
"Notice of Allowance", U.S. Appl. No. 12/882,994, Jul. 12, 2013, 9 pages.
"Notice of Allowance", U.S. Appl. No. 13/409,967, Feb. 14, 2014, 4 pages.
"Notice of Allowance", U.S. Appl. No. 13/468,918, Jun. 17, 2014, 5 pages.
"Notice of Allowance", U.S. Appl. No. 13/471,139, Mar. 17, 2014, 4 pages.
"Notice of Allowance", U.S. Appl. No. 13/471,186, Jul. 3, 2014, 7 pages.
"Notice of Allowance", U.S. Appl. No. 13/471,405, Jun. 24, 2014, 9 pages.
"Notice of Allowance", U.S. Appl. No. 13/651,232, Apr. 25, 2014, 9 pages.
"Notice of Allowance", U.S. Appl. No. 13/651,272, May 2, 2013, 7 pages.
"Notice of Allowance", U.S. Appl. No. 13/651,287, May 2, 2014, 6 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice of Allowance", U.S. Appl. No. 13/653,321, Dec. 18, 2013, 4 pages.
"Notice of Allowance", U.S. Appl. No. 13/656,520, Oct. 2, 2013, 5 pages.
"Notice of Allowance", U.S. Appl. No. 13/667,408, Mar. 13, 2014, 11 pages.
"Notice of Allowance", U.S. Appl. No. 13/715,133, Jan. 6, 2014, 7 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.
"Notice of Allowance", U.S. Appl. No. 13/939,032, Apr. 3, 2014, 4 pages.
"Notice to Grant", CN Application No. 201320097089.9, Sep. 29, 2013, 2 Pages.
"Notice to Grant", CN Application No. 201320097124.7, Oct. 8, 2013, 2 pages.
"PCI Express® SMT Connector | FCI", Retrieved from <http://www.ttiinc.com/object/fp_fci_PCISMT> on Feb. 6, 2013, Feb. 2013, 1 page.
"Restriction Requirement", U.S. Appl. No. 13/468,918, Nov. 29, 2013, 6 pages.
"Restriction Requirement", U.S. Appl. No. 13/603,918, Nov. 27, 2013, 8 pages.
"Restriction Requirement", U.S. Appl. No. 13/715,133, Oct. 28, 2013, 6 pages.
"Restriction Requirement", U.S. Appl. No. 13/367,812, Mar. 11, 2014, 6 pages.
"Restriction Requirement", U.S. Appl. No. 13/494,722, Dec. 20, 2013, 6 pages.
"Restriction Requirement", U.S. Appl. No. 13/589,773, Aug. 6, 2014, 6 pages.
"Restriction Requirement", U.S. Appl. No. 13/595,700, May 28, 2014, 6 pages.
"Restriction Requirement", U.S. Appl. No. 13/715,133, Dec. 3, 2013, 6 pages.
"Restriction Requirement", U.S. Appl. No. 13/715,229, Aug. 13, 2013, 7 pages.
"RoPD® Connectors", Retrieved from <http://www.rosenberger.de/documents/headquarters_de_en/ba_automotive/AUTO_RoPD_Flyer_2012.pdf> on May 14, 2013, Jun. 2012, 6 pages.
"Supplemental Notice of Allowance", U.S. Appl. No. 13/653,321, Mar. 28, 2014, 4 pages.
"Surface", Retrieved from <http://www.microsoft.com/surface/en-us/support/hardware-and-drivers/type-cover> on Dec. 24, 2013, 6 pages.
"Teach Me Simply", Retrieved From: <http://techmesimply.blogspot.in/2013/05/yugatech_3.html> on Nov. 22, 2013, May 3, 2013, pp. 1-6.
"Welcome to Windows 7", Retrieved from: <http://www.microsoft.com/en-us/download/confirmation.aspx?id=4984> on Aug. 1, 2013, Sep. 16, 2009, 3 pages.
"Windows 7: Display Reminder When Click on Shutdown?", Retrieved From: <http://www.sevenforums.com/customization/118688-display-reminder-when-click-shutdown.html> Jul. 8, 2014, Oct. 18, 2010, 5 Pages.
"Write & Learn Spellboard Advanced", Available at <http://somemanuals.com/VTECH,WRITE%2526LEARN--SPELL-BOARD--ADV--71000,JIDFHE.PDF>, 2006, 22 pages.

(56) References Cited

OTHER PUBLICATIONS

Bathiche, et al.,' "Input Device with Interchangeable Surface", U.S. Appl. No. 13/974,749, Aug. 23, 2013, 51 pages.

Bert, et al.,' "Passive Matrix Addressing of Electrophoretic Image Display", Conference on International Display Research Conference, Retrieved from <http://www.cmst.be/publi/eurodisplay2002_s14-1.pdf>, Oct. 1, 2002, 4 pages.

Breath, "ThinkSafe: A Magnetic Power Connector for Thinkpads", Retrieved from <http://www.instructables.com/id/ThinkSafe%3A-A-Magnetic-Power-Connector-for-Thinkpad/> on May 14, 2013, Oct. 26, 2006, 9 pages.

Burge, et al.,' "Determination of off-axis aberrations of imaging systems using on-axis measurements", SPIE Proceeding, Retrieved from <http://www.loft.optics.arizona.edu/documents/journal_articles/Jim_Burge_Determination_of_off-axis_aberrations_of_imaging_systems_using_on-axis_measurements.pdf>,Sep. 21, 2011, 10 pages.

Campbell, "Future iPhones May Unlock, Hide Messages based on a User's Face", Retrieved From:<http://appleinsider.com/articles/13/12/03/future-iphones-may-unlock-hide-messages-based-on-a-users-face> Jul. 3, 2014, Dec. 3, 2013, 11 Pages.

Caprio, "Enabling Notification Badges for Whatsapp and Other Android Apps", Retrieved From: <http://geek.ng/2013/05/enabling-notification-badges-for-whatsapp-and-other-android-apps.html> Jul. 3, 2014, May 20, 2014, 7 Pages.

Carlon, "How to Add a WhatsApp Widget to your Lock Screen", Retrieved From: <http://www.androidpit.com/how-to-add-a-whatsapp-widget-to-your-lock-screen> Jul. 3, 2014, Apr. 9, 2014, 6 Pages.

Chang, et al.,' "Optical Design and Analysis of LCD Backlight Units Using ASAP", Optical Engineering, Available at <http://www.opticsvalley.com/resources/kbasePDF/ma_oe_001_optical_design.pdf>,Jun. 2003, 15 pages.

Chavan, et al.,' "Synthesis, Design and Analysis of a Novel Variable Lift Cam Follower System", In Proceedings: International Journal of Desingn Engineering, vol. 3, Issue 4, Inderscience Publishers,Jun. 3, 2010, 1 Page.

Constine, "Cover is an Android-Only Lockscreen that Shows Apps When You Need Them", Retrieved From: <http://techcrunch.com/2013/10/24/cover-android/> Jul. 2, 2014, Oct. 24, 2013, 15 pages.

Diverdi, et al.,' "An Immaterial Pseudo-3D Display with 3D Interaction", In the proceedings of Three-Dimensional Television: Capture, Transmission, and Display, Springer, Retrieved from <http://www.cs.ucsb.edu/~holl/pubs/DiVerdi-2007-3DTV.pdf>,Feb. 6, 2007, 26 pages.

Eckel, "Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.

Grossman, et al.,' "Multi-Finger Gestural Interaction with 3D Volumetric Displays", In the proceedings of the 17th annual ACM symposium on User interface software and technology, Retrieved from <http://www.dgp.toronto.edu/papers/tgrossman_UIST2004.pdf>,Oct. 24, 2004, 61-70.

Haslam, "This App for Android Customizes your Lock Screen Automatically Depending on Time of Day or Situation", Retrieved From: <http://www.redmondpie.com/this-app-for-android-customizes-your-lock-screen-automatically-depending-on-time-of-day-or-situation/> Jul. 8, 2014, Jun. 1, 2012, 6 Pages.

Henry, "Supercharge Your Lock Screen with DashClock and These Add-Ons", Retrieved From: <http://lifehacker.com/supercharge-your-lock-screen-with-dashclock-and-these-a-493206006> Jul. 3, 2014, May 7, 2013, 12 Pages.

Hinckley, et al.,' "Codex: A Dual Screen Tablet Computer", Conference on Human Factors in Computing Systems, Apr. 9, 2009, 10 pages.

Izadi, et al.,' "ThinSight: A Thin Form-Factor Interactive Surface Technology", Communications of the ACM, vol. 52, No. 12, retrieved from <http://research.microsoft.com/pubs/132532/p90-izadi.pdf> on Jan. 5, 2012,Dec. 2009, pp. 90-98.

Jacobs, et al.,' "2D/3D Switchable Displays", In the proceedings of Sharp Technical Journal (4), Available at <https://cgi.sharp.co.jp/corporate/rd/journal-85/pdf/85-04.pdf>,Apr. 2003, pp. 15-18.

Justin, "Seidio Active with Kickstand for the Galaxy SIII", Retrieved From: <http://www.t3chniq.com/seidio-active-with-kickstand-gs3/> on Nov. 22, 2013, Jan. 3, 2013, 5 Pages.

Lahr, "Development of a Novel Cam-based Infinitely Variable Transmission", Proceedings: In Thesis of Master of Science in Mechanical Engineering, Virginia Polytechnic Institute and State University,Nov. 6, 2009, 91 pages.

Lambert, "Cam Design", In Proceedings: Kinematics and dynamics of Machine, University of Waterloo Department of Mechanical Engineering,Jul. 2, 2002, pp. 51-60.

Lane, et al.,' "Media Processing Input Device",U.S. Appl. No. 13/655,065, Oct. 18, 2012, 43 pages.

Lee, "Flat-Panel Autostereoscopic 3D Display", Optoelectronics, IET, Available at <http://ieeexplore.ieee.org/stamp/stamp.jsp?arnumber=04455550>,Feb. 2008, pp. 24-28.

Lee, et al.,' "Depth-Fused 3D Imagery on an Immaterial Display", In the proceedings of IEEE Transactions on Visualization and Computer Graphics, vol. 15, No. 1, Retrieved from <http://ieeexplore.ieee.org/stamp/stamp.jsp?arnumber=04540094>,Jan. 2009, 20-33.

Lee, et al.,' "LED Light Coupler Design for a Ultra Thin Light Guide", Journal of the Optical Society of Korea, vol. 11, Issue.3, Retrieved from <http://opticslab.kongju.ac.kr/pdf/06.pdf>,Sep. 2007, 5 pages.

Li, et al.,' "Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>,Feb. 2012, 13 pages.

Liu, et al.,' "Three-dimensional PC: toward novel forms of human-computer interaction", In the proceedings of Three-Dimensional Video and Display: Devices and Systems vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F citeseerx.ist.psu.edu%/2Fviewdoc%2Fdownload%3Fdoi%3D10.1.1.32.9469%26rep%3Drep1%26, Nov. 5, 2000, 250-281.

Mack, "Moto X: The First Two Weeks", Retrieved From: <http://www.gizmag.com/two-weeks-motorola-google-moto-x-review/28722/> Jul. 8, 2014, Aug. 16, 2013, 8 pages.

McLellan, "Microsoft Surface Review", Retrieved from <http://www.zdnet.com/microsoft-surface-review-7000006968/> on May 13, 2013, Nov. 6, 2012, 17 pages.

Miller, "MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.

Morookian, et al.,' "Ambient-Light-Canceling Camera Using Subtraction of Frames", NASA Tech Briefs, Retrieved from <http://ntrs.nasa.gov/archive/nasa/casi.ntrs.nasa.gov/20110016693_2011017808.pdf>,May 2004, 2 pages.

Patterson, "iOS 7 Tip: Alerts, Banners, and Badges—What's the Difference?", Retrieved From: <http://heresthethingblog.com/2014/01/22/ios-7-tip-whats-difference-alert/>, Jan. 22, 2014, 6 Pages.

Peli, "Visual and Optometric Issues with Head-Mounted Displays", IS & T/OSA Optics & Imaging in the Information Age, The Society for Imaging Science and Technology, available at <http://www.u.arizona.edu/~zrui3/zhang_pHMPD_spie07.pdf>,1996, pp. 364-369.

Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

Ramirez, "Applying Solventless Elastomeric Polyurethanes on Concrete in Wastewater Service", In Proceedings: Journal of Protective Coatings and Linings, May 1995, 13 pages.

(56) References Cited

OTHER PUBLICATIONS

Reisman, et al.,' "A Screen-Space Formulation for 2D and 3D Direct Manipulation", In the proceedings of the 22nd annual ACM symposium on User interface, Retrieved from <http://innovis.cpsc.ucalgary.ca/innovis/uploads/Courses/TableTopDetails2009/Reisman2009.pdf>,Oct. 4, 2009, 69-78.
Ritchie, "How to Use Lock Screen, Today, Popups, and Banners in Notification Center for iPhone and iPad", Retrieved From: <http://www.imore.com/how-use-notification-center-iphone-ipad> Jul. 3, 2014, Apr. 30, 2014, 8 pages.
Royman, "NiLS Lockscreen Notifications", Retrieved From: <https://play.google.com/store/apps/details?id=com.roymam.android.notificationswidget&hl=en> Jul. 3, 2014, Jun. 28, 2014, 3 Pages.
Salman, "Create a Minimal Lock Screen With WidgetLocker", Retrieved From: <http://android.appstorm.net/how-to/create-a-minimal-lock-screen-with-widgetlocker/> Jul. 3, 2014, Dec. 26, 2011, 12 Pages.
Sanap, et al.,' "Design and Analysis of Globoidal Cam Index Drive", Proceedings: In International Journal of Scientific Research Engineering & Technology, Jun. 2013, 6 Pages.
Schoning, et al.,' "Building Interactive Multi-Touch Surfaces", Journal of Graphics, GPU, and Game Tools, vol. 14, No. 3, available at <http://www.libavg.com/raw-attachment/wiki/Multitouch/Multitouchguide_draft.pdf>,Nov. 2009, pp. 35-55.
Siddiqui, "Hinge Mechanism for Rotatable Component Attachment", U.S. Appl. No. 13/852,848, Mar. 28, 2013, 51 pages.
Staff, "Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.
Thurrott, "Nokia Lumia "Black": Glance 2.0", Retrieved From:<http://winsupersite.com/windows-phone/nokia-lumia-black-glance-20> Jul. 8, 2014, Jan. 11, 2014, 3 Pages.
Whitwam, "How to Tweak Android's Lock Screen and Notifications", Retrieved From: <http://www.tested.com/tech/android/457766-tips-and-tricks-make-androids-lock-screen-and-notifications-even-better/?icid=pets%7Chat%7Ctestedlink%7C457766-how-to-tweak-androids-lock-screen-and-notifications> Jul. 3, 2014, Sep. 18, 2013, 4 Pages.
Yan, et al.,' "Edge-Lighting Light Guide Plate Based on Micro-Prism for Liquid Crystal Display", Journal of Display Technology, vol. 5, No. 9, Available at <http://ieeexplore.ieee.org/ielx5/9425/5196834/05196835.pdf?tp=&arnumber=5196835&isnumber=5196834>,Sep. 2009, pp. 355-357.
Yu, et al.,' "A New Driving Scheme for Reflective Bistable Cholesteric Liquid Crystal Displays", Society for Information Display International Symposium Digest of Technical Papers, Retrieved from <http://www.ee.ust.hk/~eekwok/publications/1997/bcd_sid.pdf>,May 1997, 4 pages.
Zhang, "Design of Head Mounted Displays", Retrieved at <<http://www.optics.arizona.edu/optomech/student%20reports/2007/Design%20of%20mounteddisplays%20Zhang.pdf>>, Dec. 12, 2007, 6 pages.
"Corrected Notice of Allowance", U.S. Appl. No. 14/199,924, Aug. 29, 2014, 2 pages.
"Corrected Notice of Allowance", U.S. Appl. No. 14/199,924, Sep. 5, 2014, 2 pages.
"EP Search Report", Application No. 09812072.8, Apr. 5, 2012, 6 Pages.
"EP Search Report", Application No. 09812072.8, Apr. 17, 2013, 5 Pages.
"Foreign Notice of Allowance", CN Application No. 201320097065.3, Nov. 21, 2013, 2 pages.
"Foreign Office Action", Application No. 200980134848, May 13, 2013, 7 Pages.
"Foreign Office Action", Application No. 200980134848, Dec. 4, 2013, 8 Pages.
"Foreign Office Action", Application No. 200980134848, Dec. 19, 2012, 8 Pages.
"Foreign Office Action", Application No. 201080037117.7, Jul. 1, 2014, 9 Pages.
"Foreign Office Action", Application No. 2011-526118, Aug. 16, 2013, 8 Pages.
"Foreign Office Action", Application No. 201210023945.6, Jun. 25, 2014, 6 Pages.
"Foreign Office Action", CN Application No. 200980134848, May 31, 2012, 7 Pages.
"Foreign Office Action", CN Application No. 201320097065.3, Jun. 18, 2013, 2 pages.
"Foreign Office Action", JP Application No. 2012-525632, May 2, 2014, 10 Pages.
"Foreign Office Action", JP Application No. 2012-525722, Apr. 22, 2014, 15 pages.
"International Search Report and Written Opinion", Application No. PCT/US2009/055250, Mar. 2, 2014, 10 Pages.
"Non-Final Office Action", U.S. Appl. No. 13/021,448, Jul. 22, 2014, 35 pages.
"Non-Final Office Action", U.S. Appl. No. 13/525,070, Aug. 14, 2014, 24 pages.
Boual, et al.,' "Wedge Displays as Cameras", Retrieved From: http://www.camfpd.com/72-3.pdf, SID Symposium Digest of Technical Papers, vol. 37, Issue 1, pp. 1999-2002, Jun. 2006, 4 Pages.
Chen, et al.,' "Design of a Novel Hybrid Light Guide Plate for Viewing Angle Switchable Backlight Module", Institute of Photonic Systems, National Chiao Tung University, Tainan, Taiwan., Jul. 1, 2013, 4 Pages.
Chou, et al.,' "Imaging and Chromatic Behavior Analysis of a Wedge-Plate Display", Retrieved From: http://www.di.nctu.edu.tw/2006TDC/papers/Flexible/06-012.doc, SID Symposium Digest of Technical Papers vol. 37, Issue 1, pp. 1031-1034,Jun. 2006, 4 Pages.
Ishida, et al.,' "A Novel Ultra Thin Backlight System without Optical Sheets Using a Newly Developed Multi-Layered Light-guide", SID 10 Digest, Jul. 5, 2012, 4 Pages.
Nishizawa, et al.,' "Investigation of Novel Diffuser Films for 2D Light-Distribution Control", Tohoku University, Aramaki Aoba, Aoba-ku, Sendai 980-8579, Japan, LINTEC Corporation, 23-23 Honcho, Itabashi-ku, Tokyo 173-0001, Japan., Dec. 2011, 4 Pages.
Phillips, et al.,' "Links Between Holography and Lithography", Fifth International Symposium on Display Holography, 206., Feb. 17, 1995, 9 Pages.
Powell, "High-Efficiency Projection Screen", U.S. Appl. No. 14/243,501, filed Apr. 2, 2014, Apr. 2, 2014, 26 Pages.
Travis, "P-60: LCD Smear Elimination by Scanning Ray Angle into a Light Guide", Retrieved From: http://www2.eng.cam.ac.uk/~arlt1/P_60.pdf, SID Symposium Digest of Technical Papers vol. 35, Issue 1, pp. 474-477, May 2004,2004, 4 Pages.
Travis, et al.,' "Optical Design of a Flat Panel Projection Wedge Display", 9th International Display Workshops, paper FMC6-3, Dec. 4-6, 2002, Hiroshima, Japan., Dec. 2002, 4 Pages.
"Corrected Notice of Allowance", U.S. Appl. No. 13/021,448, Aug. 17, 2015, 2 pages.
"Corrected Notice of Allowance", U.S. Appl. No. 13/564,520, Aug. 14, 2015, 2 pages.
"Corrected Notice of Allowance", U.S. Appl. No. 14/200,595, Jun. 4, 2015, 3 pages.
"Corrected Notice of Allowance", U.S. Appl. No. 14/457,881, Aug. 20, 2015, 2 pages.
"Extended European Search Report", EP Application No. 12800433.0, Oct. 28, 2014, 10 pages.
"Final Office Action", U.S. Appl. No. 14/059,280, Jul. 22, 2015, 25 pages.
"Foreign Office Action", CN Application No. 201280029520.4, Jun. 30, 2015, 11 pages.
"Foreign Office Action", JP Application No. 2012-525722, Aug. 13, 2014, 17 pages.
"International Search Report and Written Opinion", Application No. PCT/US2014/066248, Mar. 12, 2015, 10 pages.
"Non-Final Office Action", U.S. Appl. No. 14/727,001, Jul. 10, 2015, 7 pages.
"Notice of Allowance", U.S. Appl. No. 13/021,448, Jul. 30, 2015, 11 pages.

(56) References Cited

OTHER PUBLICATIONS

"Notice of Allowance", U.S. Appl. No. 14/457,881, Jul. 22, 2015, 7 pages.

"Restriction Requirement", U.S. Appl. No. 13/598,898, Jul. 17, 2015, 6 pages.

"Non-Final Office Action", U.S. Appl. No. 13/525,070, May 18, 2015, 32 pages.

"Non-Final Office Action", U.S. Appl. No. 14/059,280, Mar. 3, 2015, 18 pages.

"Notice of Allowance", U.S. Appl. No. 13/564,520, May 8, 2015, 4 pages.

"Advisory Action", U.S. Appl. No. 14/059,280, Sep. 25, 2015, 7 pages.

"Corrected Notice of Allowance", U.S. Appl. No. 13/564,520, Sep. 17, 2015, 2 pages.

"Corrected Notice of Allowance", U.S. Appl. No. 14/457,881, Oct. 2, 2015, 2 pages.

"Extended European Search Report", EP Application No. 13859406.4, Sep. 8, 2015, 6 pages.

"Foreign Office Action", CN Application No. 201310067592.4, Oct. 23, 2015, 12 Pages.

"Foreign Office Action", CN Application No. 201310067622.1, Oct. 27, 2015, 14 pages.

"Non-Final Office Action", U.S. Appl. No. 13/598,898, Oct. 23, 2015, 18 pages.

"Non-Final Office Action", U.S. Appl. No. 14/162,529, Sep. 18, 2015, 13 pages.

"Non-Final Office Action", U.S. Appl. No. 14/447,306, Oct. 1, 2015, 16 pages.

"Notice of Allowance", U.S. Appl. No. 13/525,070, Sep. 25, 2015, 4 pages.

"Notice of Allowance", U.S. Appl. No. 14/059,280, Nov. 23, 2015, 9 pages.

"Notice of Allowance", U.S. Appl. No. 14/727,001, Oct. 2, 2015, 4 pages.

"Supplemental Notice of Allowance", U.S. Appl. No. 13/525,070, Oct. 19, 2015, 2 pages.

"Final Office Action", U.S. Appl. No. 13/021,448, Jan. 2, 2015, 19 pages.

"Final Office Action", U.S. Appl. No. 13/525,070, Jan. 29, 2015, 30 pages.

"First Examination Report", NZ Application No. 628690, Nov. 27, 2014, 2 pages.

"Foreign Office Action", CN Application No. 201080037117.7, Aug. 20, 2013, 10 pages.

"Foreign Office Action", CN Application No. 201210023945.6, Dec. 3, 2013, 13 pages.

"Notice of Allowance", U.S. Appl. No. 14/200,595, Feb. 17, 2015, 2 pages.

"Notice of Allowance", U.S. Appl. No. 14/200,595, Feb. 25, 2015, 4 pages.

"Corrected Notice of Allowance", U.S. Appl. No. 13/494,651, Oct. 24, 2014, 2 pages.

"Corrected Notice of Allowance", U.S. Appl. No. 13/494,651, Dec. 29, 2014, 2 pages.

"Corrected Notice of Allowance", U.S. Appl. No. 14/199,924, Sep. 19, 2014, 2 pages.

"Final Office Action", U.S. Appl. No. 14/200,595, Nov. 19, 2014, 5 pages.

"Non-Final Office Action", U.S. Appl. No. 13/564,520, Jan. 26, 2015, 6 pages.

"Notice of Allowance", U.S. Appl. No. 13/494,651, Oct. 2, 2014, 4 pages.

"Notice of Allowance", U.S. Appl. No. 13/589,773, Sep. 16, 2014, 8 pages.

"Supplemental Notice of Allowance", U.S. Appl. No. 13/589,773, Jan. 27, 2015, 2 pages.

"Supplemental Notice of Allowance", U.S. Appl. No. 13/589,773, Nov. 5, 2014, 2 pages.

"Corrected Notice of Allowance", U.S. Appl. No. 13/525,070, Jan. 13, 2016, 2 pages.

"Corrected Notice of Allowance", U.S. Appl. No. 14/727,001, Jan. 25, 2016, 2 pages.

"Corrected Notice of Allowance", U.S. Appl. No. 14/727,001, Dec. 15, 2015, 2 pages.

"Extended European Search Report", EP Application No. 13857958.6, Dec. 18, 2015, 8 pages.

"Non-Final Office Action", U.S. Appl. No. 14/447,109, Feb. 11, 2016, 15 pages.

"Notice of Allowance", U.S. Appl. No. 14/727,001, Dec. 15, 2015, 2 pages.

"Final Office Action", U.S. Appl. No. 13/598,898, Apr. 1, 2016, 20 pages.

"Non-Final Office Action", U.S. Appl. No. 14/994,737, Apr. 5, 2016, 6 pages.

\* cited by examiner

OPTICAL STYLUS INTERACTION

BACKGROUND

One way in which a user may interact with a computing device is via a stylus. A stylus is a pen-like device that may facilitate digital hand writing and drawing as well as interactions with a touchscreen display. A stylus may be used as an alternative to direct input by a user's hand. Traditional styluses, though, typically may rely upon near surface sensors such as proximity or capacitive sensors to provide input. Accordingly, functionality provided by a traditional stylus is limited at distances beyond an inch or so from a computing device. Moreover, writing and drawing with a traditional stylus may feel unnatural because typically digital ink traces made via a stylus are not applied in a manner comparable to physical markings made by a pen, paintbrush, or other writing instrument.

SUMMARY

Optical stylus interaction techniques are described. In an implementation, a display of a computing device includes optical sensors capable of detecting images projected by a stylus. A stylus may be configured with a projection system to project various images used to convey interaction information that may be decoded and recognized by the computing device. Based on recognition of different projected images, a context for interaction of the stylus may be ascertained and corresponding operations may be performed by the computing device. The decoding may include resolving a spatial position of the stylus relative to the display device as well as movement of the stylus that defines various stylus based gestures. In addition, the environment for optical stylus interaction enables a writing mode that emulates natural writing by mapping different available images to changes in pressure applied to the stylus when in contact with the display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional styluses have limited functionality when used at a distance from a display device of a computing device. In addition, digital ink traces made by a traditional stylus are not applied in a manner comparable to physical markings made by a pen, paintbrush, or other writing instrument, which may make writing with a traditional stylus feel unnatural.

Optical stylus interaction techniques are described. In an implementation, a display of a computing device includes optical sensors capable of detecting images projected by a stylus. A stylus may be configured with a projection system to project various images used to convey interaction information that may be decoded and recognized by the computing device. Based on interpretation of different projected images, a context for interaction of the stylus may be ascertained and corresponding operations may be performed by the computing device. This may include resolving a spatial position of the stylus relative to the display device as well as movement of the stylus and/or the images that defines various stylus-based gestures. The spatial position may be determined for any or all of six degrees of freedom of the stylus. Thus, a variety of different kinds of stylus based gestures may be enabled and the stylus may be used for cursor control, gesture input, and other control functions at some distance away from the display surface.

In addition, the environment described for optical stylus interaction enables a writing mode that emulates natural writing by mapping different interpretable images to changes in pressure applied to the stylus when in contact with the display. For instance, a stylus may include a pressure switch in its tip that measures discrete pressure levels applied to the tip. The stylus may be configured to project different images for different pressure levels. Accordingly, the computing device may adjust attributes of digital ink traces in response to writing pressure changes in a manner that emulates natural writing.

In the following discussion, an example operating environment is first described that is operable to employ various optical stylus interaction techniques described herein. In the course of discussing the example operating environment, some implementation details regarding an example optically enabled stylus are also discussed. Example procedures involving the various techniques are then described, which may be employed in the example environment as well as in other environments. Accordingly, the example environment is not limited to performing the example procedures. Likewise, the example procedures are not limited to implementation in the example environment. Thereafter, an example system and components of the system suitable to implement optical stylus interaction techniques in accordance with one or more embodiments are described.

Example Operating Environment

Figure 1:
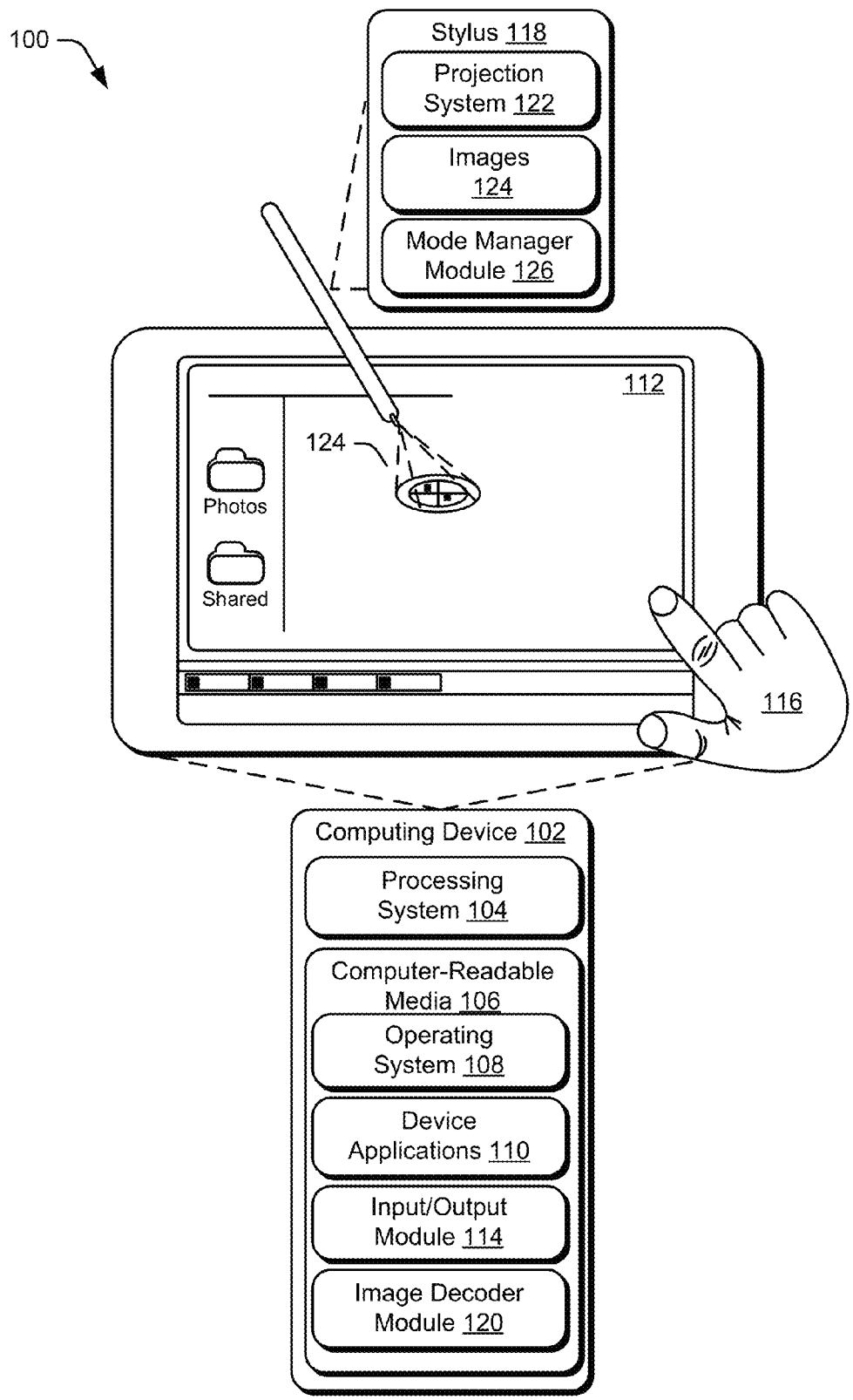
FIG. 1 is an illustration of an environment in an example implementation that is operable to employ optical stylus interaction techniques.

FIG. 1 is an illustration of an example operating environment 100 that is operable to employ optical stylus interaction techniques described herein. The operating environment includes a computing device 102 having a processing system 104 and computer-readable media 106 that is representative of various different types and combinations of media, memory, and storage components and/or devices that may be associated with a computing device. The computing device 102 is further illustrated as including an operating system 108 and one or more device applications 110 that may reside on the computer-readable media (as shown), may be implemented at least partially by one or more hardware elements, and/or may be executed via the processing system 104. Computer-readable media 106 may include both "computer-readable storage media" and "communication media," examples of which can be found in the discussion of the example computing system of FIG. 8. The computing device 102 may be configured as any suitable computing system and/or device that employ various processing systems 104 examples of which are also discussed in relation to the example computing system of FIG. 8.

The computing device 102 is also illustrated as including a display device 112 and an input/output module 114. The display device 112 may be configured as a touchscreen to enable touchscreen and gesture functionality. In some embodiments, the display device 112 is configured to include a variety of sensors configured to sense different kinds of interaction with the display device 112. For example, the display device 112 may be configured with optical sensors (e.g., a camera array, photo sensors, complementary metal-oxide-semiconductor (CMOS) sensors, charge-coupled device (CCD) imaging sensors, infrared sensors, light detecting LEDs, photodiodes, and/or other optical sensors) through which optical interaction with the display device 112 may be detected and processed. In addition or alternatively, a display device 112 may also include capacitive sensors, thermal sensors, pressure sensors, proximity sensors and the like for detection of touch input, gestures, and other interaction with the display. In at least some embodiments, the display device 112 is configured as a Sensor-In-Pixel (SIP) panel for which sensors may be associated with respective individual pixels or groups of pixels of the display device 112. A SIP panel may sense differences in light incident upon (emanating from) its surface using an array of sensor elements within the layers of the panel. Illumination may transmit through the panel and reflect off objects or images at or near the surface thereby providing a mechanism for generating optical signals that may be used to detect the objects or images.

The input/output module 114 is representative of functionality to identify various kinds of inputs and cause operations to be performed that correspond to the inputs. Inputs identifiable/interpretable by the input/output module 114 include touch, gestures, stylus input, and/or optical input that is detected via the display device 112 as well as keystrokes, mouse input, motion of the device captured via inertial sensors, input and gestures detected by a camera of the device, and/or operation of controls such as physical buttons, switches, levers, and keys provided by a device. For example, the input/output module 114 may be configured to recognize a touch input, such as a finger of a user's hand 116 as proximal to a display device 112 of the computing device 102 using touchscreen functionality.

Various input may also be recognized by the input/output module 114 as including attributes (e.g., movement, selection point, size, etc.) that are usable to differentiate between different inputs recognized by the input/output module 114. This differentiation may then serve as a basis to identify a gesture from the inputs and consequently an operation that is to be performed based on identification of the gesture. A variety of different types of gestures may be recognized by the input/output module 114, such a gestures that are recognized from a single type of input (e.g., touch gestures such as the previously described drag-and-drop gesture) as well as gestures involving multiple types and combinations of inputs. The input/output module 114 may be further be configured to detect stylus input and/or stylus gestures provided by a stylus 118 including but not limited to optical interaction of the stylus 118 with the display device 112.

To handle optical interactions, the input/output module 114 may include or otherwise make use of an image decoder module 120 that represents functionality of the computing device 102 to perform processing to decode images projected onto the display device 112 by a suitably configured stylus 118 (or other optically enabled device). Thus, in at least some embodiments, a stylus is configured to enable optical interaction with the display device 112. For instance, the example stylus 118 is depicted as including a projection system 122 that may be used to project various images 124. For example, the projection system 122 may be configured as a laser projection system that projects holographs provided by optical elements or another conventional lens projection system that use a spatial light modulator (SLM), a liquid crystal display (LCD) array, and so forth. Images 124 that are projected to the display device 112 may be detected and recognized by the computing device 102. Based on recognition of different images, a context for interaction of the stylus 118 may be ascertained and the image decoder module 120 may cause operations/actions corresponding to the context to be performed by the computing device. The decoding may include resolving a spatial position of the stylus 118 relative to the display device based on processing of the images 124 as well as movement of the stylus and/or the images that define various stylus-based gestures.

Further, different modes of operation for a stylus may be conveyed using different images 124 that are projected and recognized via the display device 112. A mode manager module 126 of the stylus represents functionality operable to cause different images to be projected for different modes such as a hover mode (e.g., cursor control mode), pointer mode, writing mode, gesture mode, game mode, and so forth. Different modes may be triggered and controlled by a mode switch of the stylus, such as a mode trigger button, a selector switch, a pressure switch in the stylus tip, and so forth. In one example, a writing mode that emulates pressure sensitive writing is implemented by using different images that are mapped to discrete pressure levels that may be measured using a pressure switch in the stylus tip or otherwise.

Additionally, different styluses may be configured to project different respective images that may be configured as or include identifiers for the different styluses. Accordingly, different identifying images and/or identifiers provided as part of an image may be employed to determine stylus identity and differentiate between multiple styluses and corresponding input. Thus, using optical techniques described above and below, various information regarding a stylus may be conveyed from the stylus to a device including position, spatial orientation, mode of operation, stylus identification, movement, input commands, gestures, and so forth. Details regarding these and other aspects of optical stylus interaction techniques are described in relation to the following figures.

Figure 2:
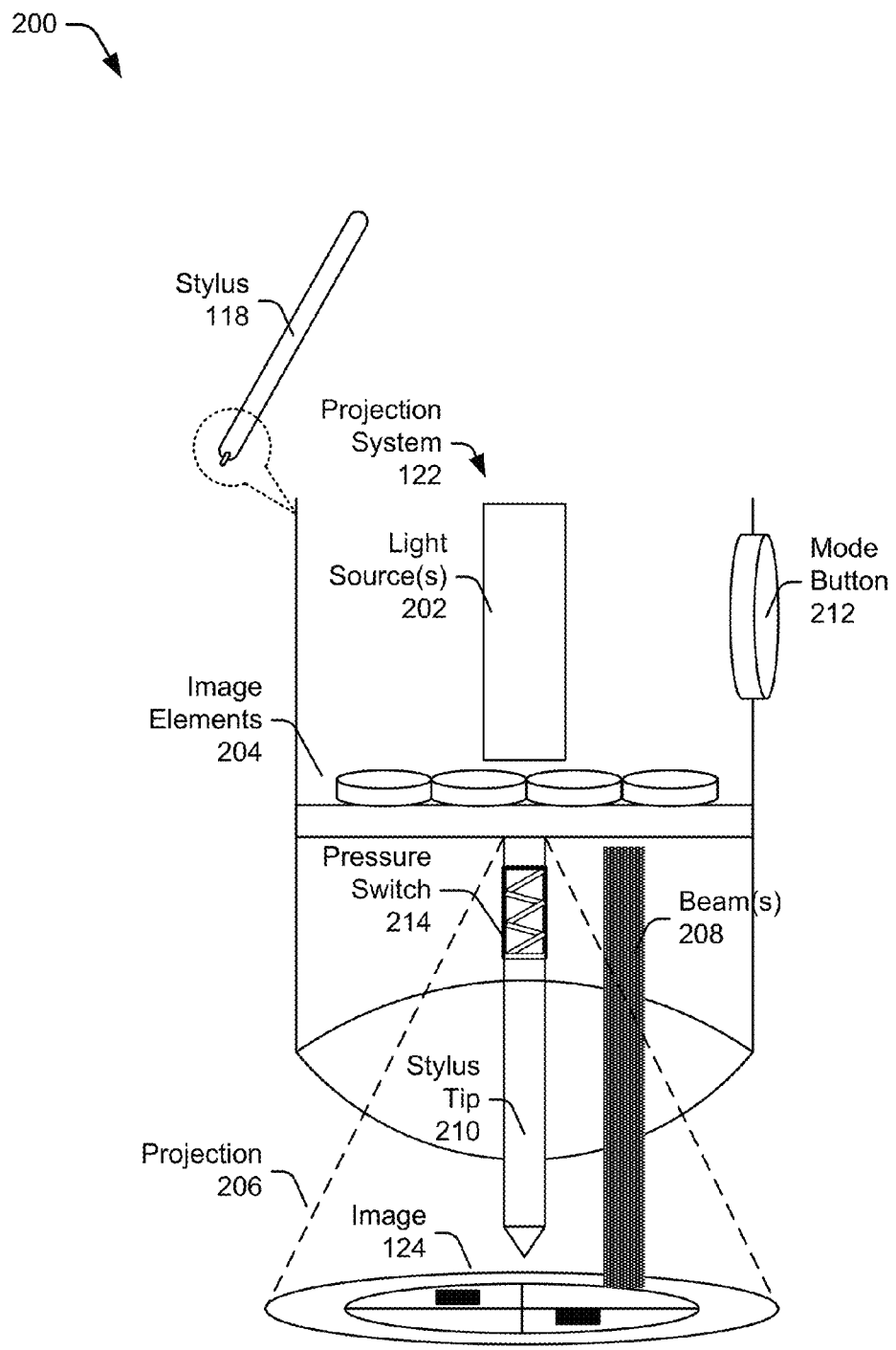
FIG. 2 illustrates an example system showing a stylus of FIG. 1 in greater detail.

FIG. 2 is a schematic illustration showing implementation details of an example of stylus, generally at 200. In the depicted example, the stylus 118 includes a projection system 122 that may be configured in various ways to project images 124 for detection and interpretation by a computing device 102. As mentioned, in at least some embodiments, an image 124 that is projected onto a display device 112 having optical sensors (such as a Sensor-In-Pixel (SIP) panel) can be optically detected based upon differences in illumination at the surface of the display. As represented in FIG. 2, the projection system 122 may include a light source 202 and one or more image elements 204 that can be employed to form a projection 206 of an image 124. Images 124 may include holographic images, digital images, glyphs, icons, patterns, pictures, arc and line combinations, and/or other suitable images that may be projected via a projection system 122 of a stylus 118.

A variety of different types of light sources are contemplated including laser diode sources, light emitting diode (LED) sources, an LCD array, SLMs, and so forth. The image elements 204 are representative of various components and techniques that may be employed to capture, contain, record, or otherwise embody image information/data used by the projection system 122 to project suitable images and/or patterns. For example, a beam 208 from the light source 202 may be used to illuminate different image elements 204 and form a corresponding projection 206 of the image 124. As described in greater detail below, one or more beams from one or more light sources may be configured to scan across different image elements 204 to produce different corresponding images for detection by the display in different scenarios. In another example, image elements 204 represent digital patterns, graphics, or spatial light modulators that may be projected via the projection system 122 using digital image projection techniques. Different images projected by a stylus are interpretable by a target computing device to recognize interaction information for the stylus conveyed by the images including but not limited to information such as a spatial position of the stylus, an activated mode for the stylus, a gesture produced by manipulation of the stylus, and/or an identity of the stylus. Thus, interpretation of projected images by the target computing device (e.g., image decoder module 120) enables the device to selectively perform corresponding operations and actions in response to the optical input from the stylus.

In one particular example, the projection system 122 is configured as a laser projection system that employs laser sources and diffractive optical elements (DOEs) to project holographic images recorded via the DOEs. For instance, image elements 204 may be configured as DOEs having image information used to reproduce corresponding holographs when appropriately illuminated via the light source 202. Accordingly, the light source 202 may be a laser, such as a vertical-cavity surface-emitting laser (VCSEL) or other suitable semiconductor laser diode.

In another example, the projection system 122 may be configured to form projections via an image forming device and a lens system that may be arranged in various ways. For instance, the image forming device represents functionality and devices used to form an image including a spatial light modulator (SLM), an LCD array, and/or a digital image processor, and so forth. The image forming device may supply a formed image to the lens system for projection onto the target surface. The lens system therefore represents functionality to direct image content to a target. For instance, an SLM may be configured to provide light gating of a dot or pixel pattern for an image to control output of the image with content directed to a surface by a corresponding lens system. A variety of other configurations are also contemplated.

Other types of projection systems are also contemplated including laser systems, LED systems, and typical digital or analog projection systems suitable to project images from a stylus to a target. In at least some embodiments, the projected images are invisible to the human eye such as being infrared (IR) projections although visible projections and images may also be employed.

The stylus 118 further includes a stylus tip 210 that facilitates touch interaction and touch gestures through contact of the stylus tip 210 with the display device. As mentioned, different modes of operation for a stylus may also be conveyed using different projected images. To facilitate mode switching by the mode manager module 126, the stylus 118 may include at least one mode switch examples of which may include a mode button 212 and/or pressure switch 214 as depicted in FIG. 2. Other suitable components and mechanisms configured to toggle between different modes are also contemplated, such as a sliding switch, a touch sensitive button, and a stylus generated gesture, to name a few examples.

In general, the projection system 122 enables optical interaction with a device via projection of images 124 that are detected in some manner by the device. By so doing, interaction information regarding the stylus can be communicated via an optical channel between the stylus and the computing device. This may occur without establishing radio frequency (RF) connections or involving RF communication between the stylus and computing device. Thus, optical channels for conveying stylus interaction information may be used independently of and/or without RF communications between the stylus and computing device.

Interaction information can include information regarding the spatial orientation and location (e.g. spatial position) of the stylus. By decoding projected images, a computing device may be able to resolve six degrees of freedom for the stylus. This includes determination of x, y, and z coordinate positions of the stylus relative to the display and angular/rotational position of the stylus along x, y and z axes. For the example coordinate system, the x-y plane is defined by the display surface and the z-axis perpendicular to the display surface defines height relative to the x-y plane.

In particular, an image decoder module 120 may be configured to ascertain spatial orientation and location (e.g. spatial position) of the stylus based upon orientation, size, distortion, and/or size relationships of elements in projected images. Naturally, the point at which the image is projected onto a display device (e.g., intersection of the optical z-axis along which the image is projected with the display surface) may be employed to determine the "cursor" position (e.g., x and y coordinates) of the stylus. A height of the stylus above (or relative to) the display (e.g., z-height) may be determined based upon size calculations for projected images. Orientation of asymmetric elements of an image may be analyzed to identify a rotational position around the "optical" z-axis of the stylus, which is also referred to as "clocking" and/or a "clock" position of the stylus. Likewise, angular orientation of the stylus on the x-axis and y-axis may be determined based upon processing of asymmetric elements, image size, size relationships, and/or distortions of various image elements that occur as the angles of image projection change. For instance, ratios of different arc elements of a projected image may be used to compute corresponding angles of image projection.

Thus, image projections that convey stylus interaction information and decoding of such images as described herein enable an optical interaction environment for a device that can support different operational modes, commands, and stylus gestures, some examples of which are discussed in this document. A variety of different configurations and operational modes are contemplated to create a stylus suitable to implement optical stylus interaction techniques described herein.

For example, styluses may range from relatively simple styluses designed to project a single image to more complex styluses designed to project multiple image, beams, and/or sequences of images. One or multiple lasers and/or other light sources may be employed for different stylus configurations.

Different operational modes may generally include at least a hover mode (e.g., cursor control mode) for interaction with a device from a distance and writing mode that may be activated to apply digital ink traces for writing, painting, and drawing in some scenarios. In hover mode, the stylus may perform control functions through optical interaction to manipulate operations of a device including controlling applications and user interfaces of the device. Some examples of control functions include controlling a cursor, menu navigation, input of stylus-based gestures, and so forth. The control functions may be determined at least in part based upon decoding of projected images and corresponding spatial positions and/or gestures. For instance, movement of the stylus between successive spatial positions may define a gesture and/or trigger a corresponding control function associated with the movement/gesture. Thus, the stylus in hover mode acts as sort of a "magic wand" that a user may point, wave, flick, rotate, and otherwise manipulate to cause corresponding actions by a computing device based upon decoding of one or more images projected from the stylus in response to manipulation of the stylus. The hover mode may be supported in a defined zone extending out from the display surface and at a distance from the display. For example, hover mode and corresponding optical interactions may be enabled at a range of distances from at an inch or so above the display surface to several feet from the display, and even at greater distances, such as from across a MOM.

At or near the surface of a display, a writing mode may be activated in response to projection of corresponding images that trigger the writing mode. For instance, detection of a particular image for the writing mode via optical sensors of a display may trigger writing mode. It should be noted that optical detection techniques may be used alone or conjunction with other techniques. For example, proximity sensors, capacitive sensors, and the like may be combined with optical sensing techniques to detect positioning of the stylus tip at or near the display surface and/or to toggle between modes accordingly. Writing mode may also be activated when the stylus is positioned at a distance from the display in some embodiments. For instance, writing mode may be triggered responsive to operation of a mode switch that cause images for the writing mode to be directed to the display. Generally, in writing mode digital ink traces are applied to emulate writing, drawing, painting, and so forth. Writing mode may also emulate natural pressure sensitive writing as described in greater detail below.

To further illustrate, consider now a discussion of few example configurations for a stylus in accordance with one more embodiments. In one approach, a stylus may be configured to project a single fixed image/pattern. Such a fixed pattern system may be implemented using a single DOE and laser diode configured to project the single fixed image/pattern. Here, the single fixed image may be used to determine any or all of the six degrees of freedom (6DOF) of the stylus as mentioned previously. Toggling projection of the image on and off via a mode switch may also be employed to switch between different modes. For instance, a mode button 212 may be selectively depressed to toggle selected stylus modes on or off in a binary fashion. In one example, a mode button 212 may be configured to toggle between hover mode and writing mode.

In another configuration, a stylus may be designed to project multiple different images that may be used to convey different kinds of stylus interaction information. By way of example, one image projection may be used to convey spatial position while a separate projection is used to convey mode information. Other kinds of projections are also contemplated, such as separate projections used to convey a stylus identification image and/or to implement a visible beam/image for a pointer function. Multiple images that are used for different purposes may be projected concurrently as well as at different times, such as by using different respective light sources, elements, and beams to form multiple different image projection streams. Thus, multiple independent image projection streams may be employed in some scenarios.

In another approach, the same image projection stream may be configured to project different images at different times. By way of example and not limitation, one image projection stream may be used to project a stylus identification image during initialization/calibration of the stylus, one or more images suitable for resolving spatial orientation (e.g., 6DOF) in a hover mode, and/or one or more images suitable to convey different writing/drawing attributes in a writing mode. This may occur by illuminating different image elements 204 that encode different images at different times. In particular, the mode manager module 126 may operate to cause the projection system 122 to form different images 124 in different contexts and/or in response to mode changes determined via a mode switch or otherwise.

In at least some embodiments, a pressure switch 214 may also be employed to trigger a writing mode based at least in part upon contact of a stylus tip 210 with a display. The pressure switch 214 represents functionality to enable measurement of different pressure levels applied to the stylus tip 210. For example, a resistive pressure transducer may be employed to sense pressure applied to the tip. In another approach, pressure may be sensed optically using a prism or photodiode to sense variable amounts of light that are mapped to different pressure levels. Further, different images and/or corresponding modes of operation may be mapped to the different pressure levels. Thus, contact of stylus tip 210 may cause pressure measurement by the pressure switch 214 that activates the writing mode through projection of corresponding images. A sequence of images corresponding to different writing pressure levels may be projected as the measured pressure level changes. In this manner, attributes of digital ink traces applied for writing, painting, and/or drawing may be adjusted to respond in a natural, pressure-sensitive way to changes in pressure on the stylus tip 210.

In particular, digital ink traces generally may be adjusted to become darker and/or thicker as pressure placed on the stylus tip increases to emulate the way in which physical markings change with increased pressure on a pen, paintbrush, or other instrument. In other words, pressure sensitive writing is emulated by adjusting digital ink traces applied via the stylus to match a pressure level defined by a corresponding projected image. Other writing/drawing attributes may also be conveyed in a comparable manner by mapping the attributes to different images and patterns. By way of example and not limitation, selections of drawing tools, font types, colors, line styles, brush/pen type, and other attributes may be conveyed by projection of images that are mapped to the attributes. In at least some embodiments selections of various attributes may be accomplished using corresponding stylus-based gestures.

More generally, the environment described herein for optical stylus interaction enables definition and recognition of various stylus-based gestures. This may include gestures for selection of different writing/drawing attributes noted above as well as other gestures for device control, content navigation, user interface manipulation, and so forth. In addition, different gestures may be implemented in different modes. Gestures may be defined based upon measurement of spatial position of the stylus and/or sequential changes in the spatial position that are ascertained using optically conveyed information.

By way of example and not limitation, in hover mode a twisting or rotating gesture in which the stylus is rotated around the z-axis may drive forward and back navigation between different pages for a browser, presentation, or electronic book; a wrist flick gesture may be configured to select an item and/or open an item; waving the stylus up/down or left/right may cause a scrolling like response; moving the stylus up and down in the z-direction may cause zooming in and out, and so forth. In writing mode, a twisting or rotating gesture may facilitate selection of different writing/drawing attributes, a wrist flick gesture may be cause a spattering pattern of ink traces to appear (like spattering paint), a sweeping gesture may operate an erase function, and so forth. Thus, a variety of stylus-based gestures may be implemented of which the gestures enumerated above are but a few illustrative examples.

In some cases, a display device 112 may be configured to employ some form of ambient light cancellation. In such scenarios, an image projected by a stylus 118 runs the risk of being interpreted as ambient light and be canceled out. As such, a projection system 122 may be configured to account for ambient light cancellation and adjust projections accordingly. This may include configuring image projections for particular wavelengths or ranges that are not canceled and/or pulsing projections in sync with a display. For instance, illumination light for the display may be pulsed in order to differentiate between local light and ambient light and cancel out ambient light. Accordingly, to avoid interpretation of image projections as ambient light, a projection system 122 may be configured to include a photonic detector/receiver, such as a photodiode, that may be used to detect pulsing and sync projections with pulsed illumination light used for a display. Pulsing projections in this manner may additionally serve to improve battery life since projections may occur intermittently at short time intervals in which sensors of the display are integrating the image content.

Figure 3:
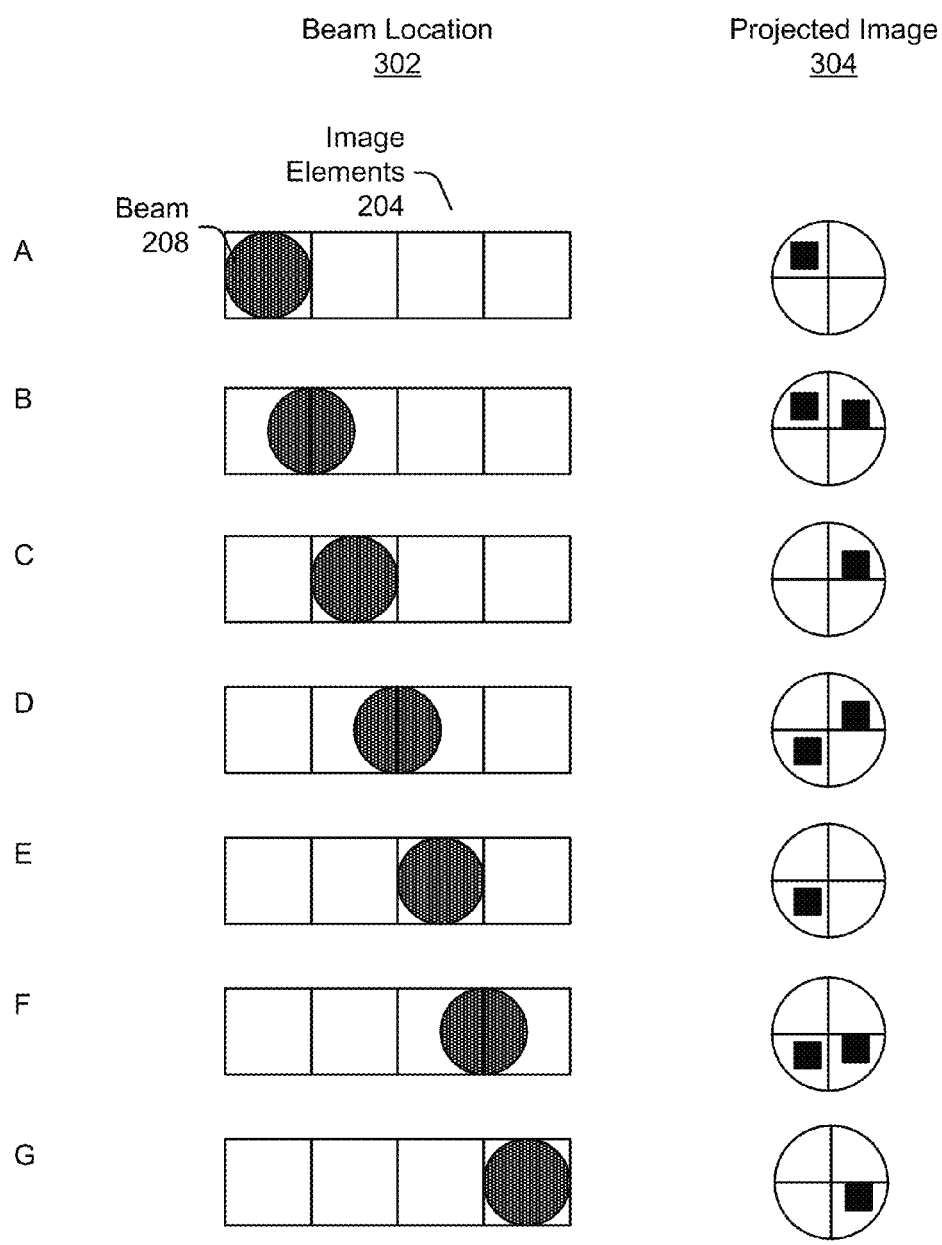
FIG. 3 depicts an illustration of an example sequence of images to implement optical stylus interaction techniques.

FIG. 3 depicts generally at 300 an example sequence of images that may be mapped to different pressure levels to implement pressure sensitive writing. Naturally, different images may be mapped to other writing/drawing attributes as well as different operational modes in a comparable manner. It just so happens that in this example, the image projected by a stylus is configured to change based on changes in writing pressure applied to the stylus.

In particular, scanning of a beam 208 across a series of image elements 204 is represented by the series of different images shown in FIG. 3. As mentioned, the image elements 204 may be configured as DOEs encoding respective holograms that may be illuminated by a suitable laser source. Other equivalent imaging techniques may also be employed. The beam location 302 of the beam 208 may be controlled and adjusted based upon changes in pressure detected via a pressure switch 214 (or other mode switch input). This causes the beam to illuminate different elements and/or output different projected images 304 for different pressure levels. In this example, four image elements 204 are employed to form seven different images labeled by letters A through G. Here, when the beam intersects boundaries of two elements, content from both of the two elements may be illuminated thus giving the seven different example images. Relatively simple patterns, glyphs, icons or other images may be employed to convey different levels or modes. Additionally or alternatively, images may also be configured to contain asymmetric content and combinations of arcs and lines as mentioned previously to facilitate decoding of spatial position in appropriate situations.

Although four image elements 204 are shown in this example, a fewer or greater number of image elements 204 may be employed in different scenarios. Generally, the number of different elements and therefore the number of levels or modes that may be accommodated by an image sequence is dependent upon the size of the holograms and the beam footprint as well as consideration of the range of pressure input (or other mode switch input) and practical constraints on stylus size.

Having considered an example environment and details for an optically enabled stylus, consider now some example procedures for optical stylus interaction in accordance with one or more embodiments.

Example Procedures

The following discussion describes optical stylus interaction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example operating environment of FIG. 1 and example stylus details discussed in relation to FIGS. 2 and 3.

Figure 4:
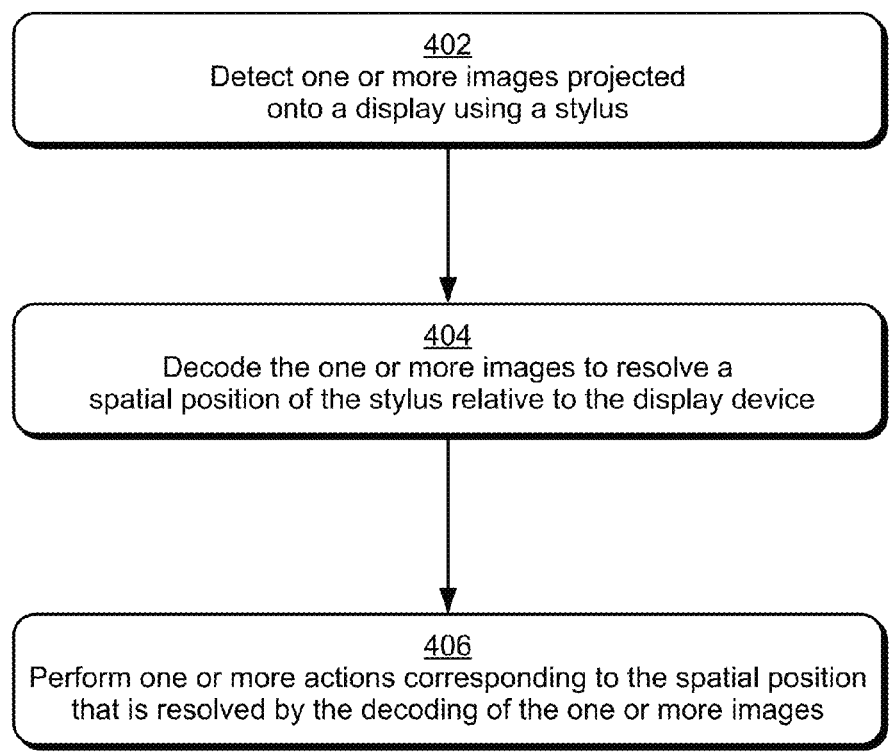
FIG. 4 is a flow diagram depicting a procedure in an example implementation in which projected images are decoded to trigger corresponding actions.

FIG. 4 depicts a procedure 400 in an example implementation in which optical techniques are used to resolve a spatial position of a stylus. One or more images that are projected onto a display using a stylus are detected (block 402). For example, a SIP panel display or other display device 112 having optical sensors may detect images produced via a projection system 122 of a stylus 118 via an input/output module 114 or otherwise. Various different kinds of images 124 may be projected in different scenarios. Optical sensors generally detect the images projected onto the display by measuring changes in illumination caused by the image projection.

The one or more images are decoded to resolve a spatial position of the stylus relative to the display device (block 404). For example, input/output module 114 may include or make use of an image decoder module 120 to decode detected images. Here, the image decoder module 120 is configured to analyze image attributes (e.g., size, position, distortion, rotation, and so forth) to ascertain the spatial position of the stylus that corresponds to the projected the image. The image decoder module 120 may resolve spatial position of the stylus for six degrees of freedom as discussed in relation to FIG. 2. In general, optical stylus interaction techniques including detecting and decoding of images by a computing are based upon optical projections of the one or more images by the stylus. Such optical projections do not rely upon or involve radio frequency (RF) communications between the stylus and target device.

Certain features of an image may be selected by design to facilitate resolving spatial position of the stylus for six degrees of freedom. By way of example, the origin, pointing, and angular extent of the projected image may be known by design, or may be assessed by measurement. Accordingly, projected content may be designed to contain circular and/or annular elements that, when projected, may be analyzed relative to a known pattern for the origin, pointing and angular content/extent of the image to recognize changes as position of the stylus changes. Likewise, changes in the size of the image may also be detected. Changes in image size and various image elements can be used to determine the z-height of the stylus.

Additionally, line width around the perimeter or borders of a projected image may be used to ascertain an angular direction pointing back to a stylus. In turn, the angular direction can be employed to determine x-y position of the stylus in relation of the display surface. Line width variations may be included around the border/perimeter of an image to facilitate position assessment and avoid ambiguities. A circular or annular image with line width variation may be designed to enable resolution of five degrees of freedom. Further, addition of a fiducial marker and/or asymmetric elements within the projected image, such as a line perpendicular to the perimeter, or a dot, enables assessment of rotational or 'clocking' position. Therefore, generally speaking, an image that combines circular or annular elements with line width variation and a fiducial marker can enable resolution of six degrees of freedom for the stylus. One or more actions are performed corresponding to the spatial position that is resolved by decoding of the one or more images (block 406). For example, the image decoder module 120 may provide information on spatial position that may be used by the input/output module 114 to recognize various stylus gestures, some examples of which were described previously. Accordingly, actions corresponding to a recognized stylus gesture may be performed. For instance, movement of the stylus to different spatial positions may be detected and used for cursor control and/or to recognize gestures. A particular recognized gesture, such as rotating or "clocking" the stylus around the z-axis, may be detected based on successive spatial positions of the stylus. For instance, gestures may be recognized by determining relative changes in orientation of the projected content and/or a portion of the projected content based on a fiducial marker or asymmetric elements. The particular recognized gesture may cause a corresponding action, such as turning a page or navigating a user interface menu. Position information regarding the stylus may also be used to drive changes between different operational modes.

Figure 5:
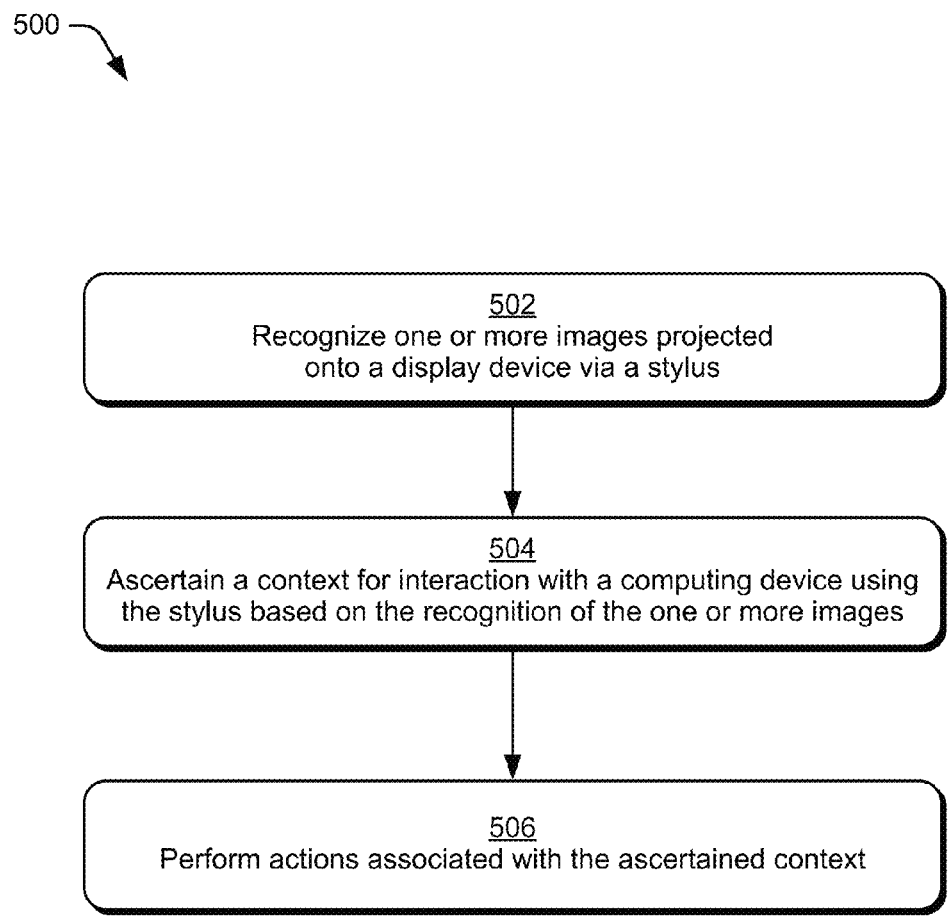
FIG. 5 is a flow diagram depicting a procedure in an example implementation in which projected images are interpreted to determine a context for interaction with a computing device using a stylus.

FIG. 5 depicts a procedure 500 in an example implementation in which images projected by a stylus are recognized to drive corresponding actions by a device. One or more images projected onto a display device via a stylus are recognized (block 502). As before, this may include a wide variety of images 124 used to convey different interaction information as described in relation to FIGS. 1-3. For example, different images may be projected to convey a stylus identifier, spatial position, operational modes, writing pressure levels, and so forth. An image decoder module 120 or other comparable functionality of a device may operate to decode the images.

A context for interaction with a computing device using the stylus is ascertained based on the recognition of the one or more images (block 504) and actions associated with the ascertained context are performed (block 506). For example, different images may be indicative of gestures, commands, stylus position and movement, and other interaction conducted with the stylus. The images may be mapped to corresponding actions to be performed when the images or stylus-based gestures are recognized. A context for interaction of the stylus may be defined based on stylus information such as a mode for the stylus, the particular image projected, current spatial position of the stylus, and movement of the stylus. The context may also include device information such as a cursor position, an active interface and/or application, item or window focus/selection, and so forth. Thus, a particular image that is projected may represent a corresponding context that can be identified based on recognition of the particular image. Based on the ascertained context, the input/output module 114 or other comparable functionality of a device may determine appropriate responsive actions to take, such as cursor movement, action associated with a gesture, a switch between modes, navigation functions, launching or closing an application, and so forth.

Figure 6:
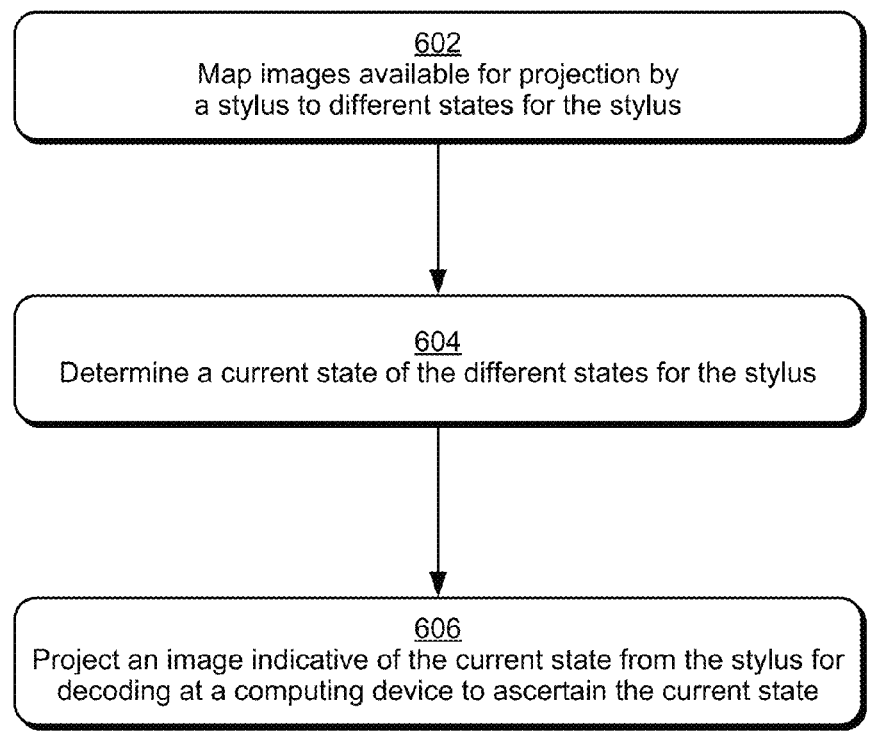
FIG. 6 is a flow diagram depicting a procedure in an example implementation in which a stylus projects images to convey corresponding interaction information.

FIG. 6 depicts a procedure 600 in an example implementation in which a stylus projects images to convey interaction information regarding the stylus. Images available for projection by a stylus are mapped to different states for a stylus (block 602). For example, different images 124 and/or patterns that may be projected by a stylus 118 may be mapped to different states including different pressure levels, different modes, and/or different spatial positions as discussed previously. A mode manager module 126 of a stylus may include a table, database, file or other suitable mapping information to map the different states to corresponding images.

A current state of the different states for the stylus is determined (block 604). For instance, the mode manager module 126 of the stylus may obtain information regarding the current state from various mode switches and/or other sensors of the stylus. This enables the mode manager module 126 to compute the current state and cause projection of an image corresponding to the current state.

An image indicative of the current state is projected by the stylus for decoding at a computing device to ascertain the current state (block 606). Here, the mode manager module 126 may reference mapping information to look-up an image that is to be projected based on the current state or otherwise select between different images that a stylus is capable of projecting based on the current state. The mode manager module 126 may then cause the projection system of the stylus to project an appropriate image. Once projected, the image may be interpreted by a target computing device as described previously and corresponding operations and actions may be triggered.

Figure 7:
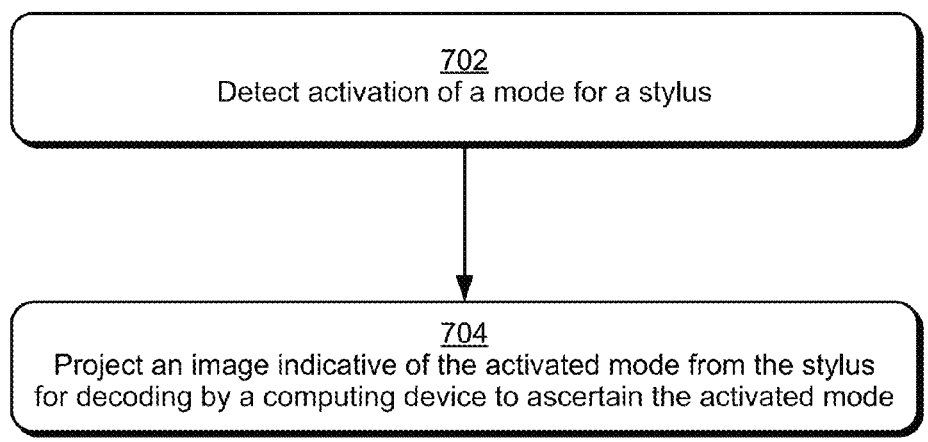
FIG. 7 is a flow diagram depicting a procedure in an example implementation in which a stylus projects images indicative of an activated mode.

FIG. 7 depicts a procedure 700 in an example implementation in which a stylus projects an image indicative of an active mode. Activation of a mode for a stylus is detected (block 702). The detection may occur in any suitable way. For example, activation of a mode may be detected by a mode manager module 126 based on operation of a mode switch as described previously. In another example, a mode (such as hover mode or writing mode) may be triggered based upon a gesture or spatial positioning of a stylus. Additionally, a mode (such as a stylus identification mode) may be triggered by an initialization sequence when a stylus is powered on. Detectable modes may also include different writing pressure modes corresponding to discrete pressure levels measured by a pressure switch.

An image indicative of the activated mode is projected from the stylus for decoding by a computing device to ascertain the active mode (block 704). In other words, an image corresponding to the activated mode is projected for detection and processing by the computing device 102. For instance, a stylus identification image incorporating an identifier may be used to identify a particular stylus and or distinguish between different styluses in a stylus identification mode. Images mapped to pressure levels may be projected in a writing mode as described previously. In addition or alternatively, images suitable to resolve spatial positioning, control a cursor, and/or recognize gestures may be projected for activated modes as appropriate. Thus, the computing device 102 is able to determine the mode through optically conveyed information and take appropriate responsive action to toggle between modes, perform commands and operations designated by the optically conveyed information, and so forth.

Having considered some example procedures for optical stylus interaction techniques, consider now a discussion of an example system and components of the system that may be employed to implement aspects of the described techniques in one or more embodiments.

Example System

Figure 8:
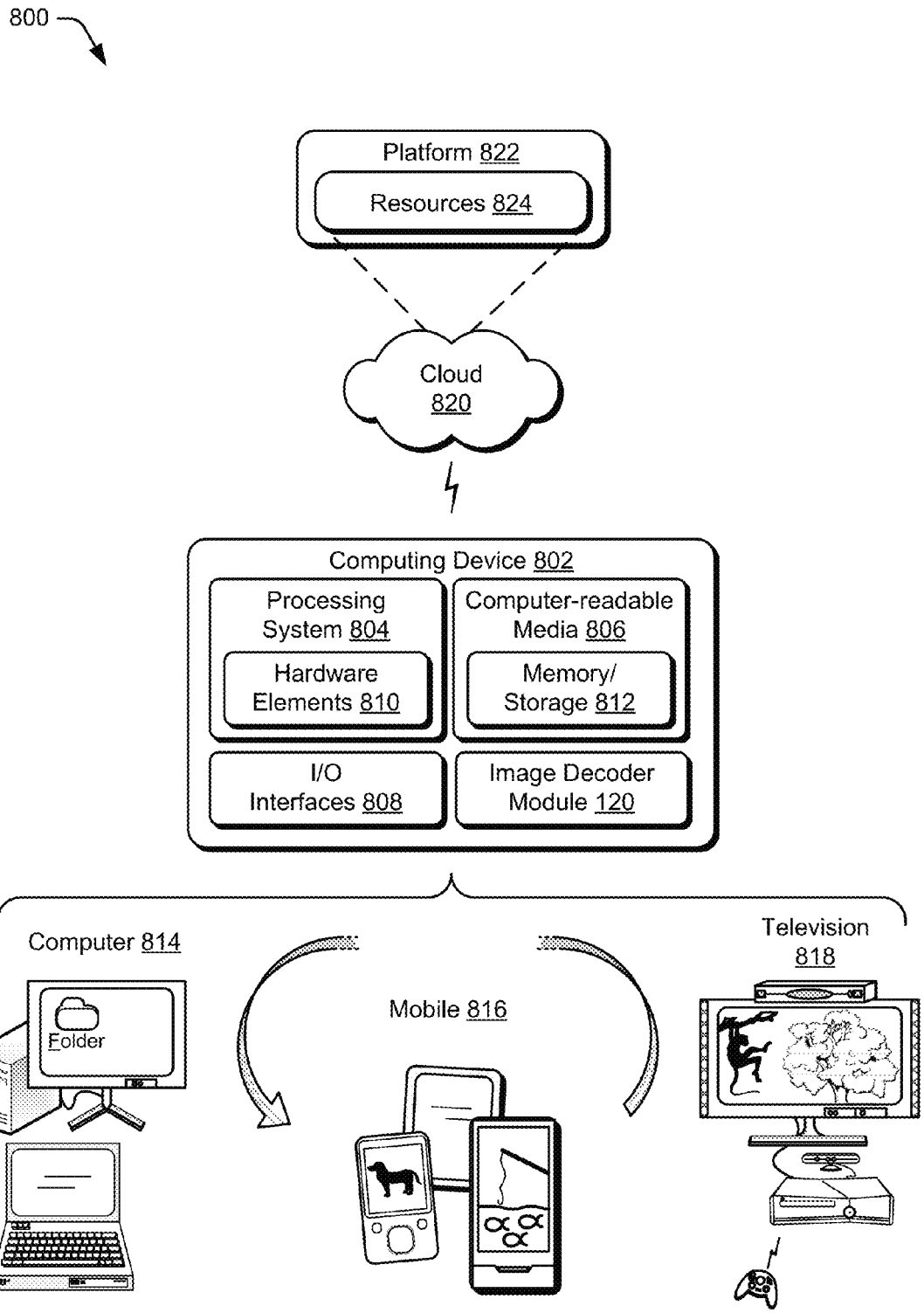
FIG. 8 illustrates an example system and components of the system that can be employed to implement embodiments of the techniques described herein.

FIG. 8 illustrates an example system 800 that includes an example computing device 802 that is representative of one or more computing systems and/or devices that may implement the various techniques described herein. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice input/control, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including device applications 110, input/output module 114, image decoder module 120, mode manager module 126 and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the image decoder module 120 on the computing device 802. The functionality of the image decoder module 120 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
   a display device including one or more optical sensors configured to detect images projected onto a surface of the display device by a stylus;
   an image decoder module configured to:
      decode a detected image to ascertain a corresponding context for interaction with the computing device using the stylus by recognizing the detected image from multiple different images that each represent different contexts, the multiple different images each corresponding to a graphic that results from illuminating a series of image elements of the stylus differently than the series of image elements is illuminated for other graphics; and
      cause performance of one or more actions by the computing device that are associated with the ascertained context.

2. A computing device as described in claim 1, wherein the display device comprises a sensor-in-pixel (SIP) panel having the optical sensors associated with respective pixels of the display device.

3. A computing device as described in claim 1, wherein the image decoder module is further configured to resolve the spatial position of the stylus based upon decoding of the detected image.

4. A computing device as described in claim 1, wherein:
the image decoder module is further configured to recognize a gesture input via the stylus based upon decoding of the detected image; and
the one or more actions correspond to the recognized gesture.

5. A computing device as described in claim 1, wherein:
the context comprises an operational mode for interaction with the computing device using the stylus that is defined by the detected image; and
performance of one or more actions comprises switching to the operational mode.

6. A computing device as described in claim 1, wherein the image decoder module is further configured to detect movement of the stylus based upon decoding of the detected image.

7. A computing device as described in claim 1, wherein:
the detected image defines a pressure level for a writing mode of the stylus; and
the one or more actions comprise emulating pressure sensitive writing by adjusting attributes of digital ink traces applied via the stylus to match the pressure level defined by the detected image.

8. A computing device as described in claim 1, wherein the image decoder module is further configured to determine an identity of the stylus based upon an identifier for the stylus that is projected as part of the detected image.

9. A method implemented by one or more modules at least partially in hardware of a computing device, the method comprising:
detecting one or more images projected onto a display device associated with the computing device using a stylus;
resolving a spatial position of the stylus relative to the display device by:
decoding the one or more projected images that, when decoded, reveal information that is indicative of the spatial position relative to the display device, the decoding including analyzing the one or more projected images relative to known patterns of a mapping of multiple different projectable images that each represent different information indicative of the spatial position, at least one of the multiple different projectable images corresponding to a graphic containing asymmetric content that is analyzable to facilitate resolution of the spatial position; and
ascertaining projection characteristics of the one or more projected images that are further indicative of the spatial position relative to the display device; and
performing one or more actions corresponding to the spatial position that is resolved by the decoding of the one or more projected images and the ascertaining of the projection characteristics of the one or more projected images.

10. A method as described in claim 9, further comprising:
recognizing an image projected by the stylus that is indicative of a writing mode of the stylus and conveys information regarding a pressure level to apply to digital ink traces input via the stylus; and
in response to recognition of the image indicative of the writing mode, activating the writing mode and causing digital ink traces input via the stylus to have attributes defined for the pressure level conveyed by the image.

11. A method as described in claim 9, wherein the images are detected via one or more optical sensors incorporated with the display device.

12. A method as described in claim 9, wherein the detecting and the decoding of the one or more projected images by the computing device are based on optical projections of the one or more projected images by the stylus that do not involve radio frequency (RF) communications.

13. A method as described in claim 9, wherein ascertaining the projection characteristics of the one or more projected images to resolve the spatial position comprises determining a height of the stylus relative to the display based at least in part upon size calculations for the one or more projected images.

14. A method as described in claim 9, wherein ascertaining the projection characteristics of the one or more projected images to resolve the spatial position comprises processing the asymmetric content of the one or more projected images to identify a rotational position of the stylus around an optical axis along which the one or more projected images are projected.

15. A method as described in claim 9, wherein ascertaining the projection characteristics of the one or more projected images to resolve the spatial position comprises resolving the spatial position for six degrees of freedom of the stylus based on analysis of image size, distortion of image elements, and orientation of the asymmetric content for the one or more projected images.

16. A method as described in claim 9, wherein decoding the one or more projected images to resolve the spatial position comprises recognizing a gesture based upon a detection of movement of the stylus in accordance with the spatial position.

17. A method as described in claim 9, wherein the one or more actions comprise control functions to manipulate operations of the computing device determined based in part upon the spatial position.

18. A stylus comprising:
a projection system;
one or more image elements embodying image information for corresponding images to enable projection of the images via the projection system to a target computing device; and
a mode manager module configured to cause the projection system to project different images using the image information embodied by the one or more image elements in response to manipulation of the stylus, the different images each comprising a different combination of graphical content and projected to convey different interaction information for the stylus optically for decoding by the target computing device, the different projected images interpretable by the target computing device with projection characteristics of detected projected images to recognize one or more of a spatial position of the stylus, an activated mode for the stylus, or a gesture produced by manipulation of the stylus.

19. A stylus as described in claim 18, wherein:
the one or more image elements comprise diffractive optical elements having image information to reproduce recorded holographic images; and
the projection system comprises a laser projection system that employs a laser diode to illuminate the diffractive optical elements and form the corresponding images to convey the interaction information optically to the target computing device.

20. A stylus as described in claim 18, further comprising a pressure switch to measure pressure applied to a tip of the stylus, wherein the mode manager module is further configured to:
- determine a pressure level measured by the pressure switch; and
- cause the projection system to project a particular image indicative of the determined pressure level to enable the target computing device to adjust attributes of digital ink traces input via the stylus to match the determined pressure level that is conveyed optically by the particular image.

* * * * *